United States Patent
Uchikawa et al.

(10) Patent No.: US 11,613,101 B2
(45) Date of Patent: Mar. 28, 2023

(54) MAGNETIC MATERIAL, LAMINATED MAGNETIC MATERIAL, LAMINATED PACKET, AND LAMINATED CORE USING MAGNETIC MATERIAL, AND MAGNETIC MATERIAL PRODUCING METHOD

(71) Applicants: HITACHI METALS, LTD., Tokyo (JP); METGLAS, INC., Conway, SC (US)

(72) Inventors: Akio Uchikawa, Tokyo (JP); Nakao Moritsugu, Tokyo (JP); Daichi Azuma, Tokyo (JP)

(73) Assignees: HITACHI METALS, LTD., Tokyo (JP); METGLAS, INC., Conway, SC (US)

( * ) Notice: Subject to any disclaimer, the term of this patent is extended or adjusted under 35 U.S.C. 154(b) by 323 days.

(21) Appl. No.: 16/759,752

(22) PCT Filed: Oct. 25, 2018

(86) PCT No.: PCT/JP2018/039718
§ 371 (c)(1),
(2) Date: Apr. 28, 2020

(87) PCT Pub. No.: WO2019/087932
PCT Pub. Date: May 9, 2019

(65) Prior Publication Data
US 2021/0178728 A1     Jun. 17, 2021

(30) Foreign Application Priority Data

Oct. 31, 2017   (JP) .............................. JP2017-210523
Mar. 23, 2018   (JP) .............................. JP2018-056531

(51) Int. Cl.
*B32B 15/04*     (2006.01)
*H01F 1/153*     (2006.01)
(Continued)

(52) U.S. Cl.
CPC .............. *B32B 15/043* (2013.01); *B32B 7/12* (2013.01); *B32B 15/18* (2013.01); *C22C 45/02* (2013.01);
(Continued)

(58) Field of Classification Search
CPC ......... B32B 15/043; B32B 7/12; B32B 15/18; B32B 2307/208; B32B 2307/536;
(Continued)

(56) References Cited

U.S. PATENT DOCUMENTS 5,935,347 A *   8/1999   Suzuki ................ H01F 41/0226
                                                                                                        29/605
2004/0085173 A1     5/2004   Decristofaro et al.
(Continued)

FOREIGN PATENT DOCUMENTS

JP            62-216309         9/1987
JP           2001-307936       11/2001
(Continued)

OTHER PUBLICATIONS

[NPL-1] Lipot, L.; "Properties of commonly used polymers"; Multimedia Design and Technology Education, Jul. 3, 2019; <https://www.notesandsketches.co.uk/Polymer_properties.html>. (Year: 2019).*
(Continued)

*Primary Examiner* — Frank J Vineis
*Assistant Examiner* — Donald M Flores, Jr.
(74) *Attorney, Agent, or Firm* — Nixon Peabody LLP; Jeffrey L. Costellia

(57) ABSTRACT

A magnetic piece, a multilayer magnetic piece and a multilayer core with an adhesive agent of excellent saturation magnetic flux density are provided. The magnetic piece includes a soft magnetic amorphous alloy ribbon 1 and a resin layer 2 provided on at least one surface of the soft magnetic amorphous alloy ribbon. The resin layer contains
(Continued)

a resin whose Shore D hardness is not more than 60. The resin may have a Shore D hardness of not more than 25 or may have a Shore D hardness of not less than 1.

12 Claims, 22 Drawing Sheets

(51) Int. Cl.
- *H01F 41/02* (2006.01)
- *B32B 7/12* (2006.01)
- *B32B 15/18* (2006.01)
- *C22C 45/02* (2006.01)

(52) U.S. Cl.
CPC ..... *H01F 1/15383* (2013.01); *H01F 41/0226* (2013.01); *B32B 2307/208* (2013.01); *B32B 2307/536* (2013.01); *C22C 2202/02* (2013.01)

(58) Field of Classification Search
CPC . C22C 45/02; C22C 2202/02; H01F 1/15383; H01F 41/0226
See application file for complete search history.

(56) References Cited

U.S. PATENT DOCUMENTS

| | | | |
|---|---|---|---|
| 2007/0040643 A1* | 2/2007 | Inoue | H01F 41/0226 336/213 |
| 2010/0012881 A1 | 1/2010 | Aramaki | |
| 2010/0085778 A1* | 4/2010 | Saito | H01F 17/041 363/20 |

FOREIGN PATENT DOCUMENTS

| | | |
|---|---|---|
| JP | 2002-151316 | 5/2002 |
| JP | 2003-163486 | 6/2003 |
| JP | 2006-505143 | 2/2006 |
| JP | 2007-311652 | 11/2007 |
| JP | 2008-060395 | 3/2008 |
| WO | WO-2008-132810 | 11/2008 |

OTHER PUBLICATIONS

International Search Report for PCT/JP2018/039718 dated Jan. 22, 2019.

* cited by examiner (a)

(b)

(A)   (B)

(A)　　　　　　　　　　(B)

(A)                   (B)

(A)  (B)

MAGNETIC MATERIAL, LAMINATED MAGNETIC MATERIAL, LAMINATED PACKET, AND LAMINATED CORE USING MAGNETIC MATERIAL, AND MAGNETIC MATERIAL PRODUCING METHOD

TECHNICAL FIELD

The present application relates to a magnetic piece, a multilayer magnetic piece, a multilayer packet, and a multilayer core for transformers, and a manufacturing method of the magnetic piece.

BACKGROUND ART

An amorphous alloy ribbon is stacked into a multilayer structure or rolled up for use as a core of a transformer or the like. For the sake of convenience in handling, in some cases, a plurality of ribbons are stacked up for use as a part. For example, as disclosed in Patent Document No. 1, a magnetic piece with an adhesive agent for stacking has been known.

CITATION LIST

Patent Literature

Patent Document No. 1: Japanese Laid-Open Patent Publication No. 2002-151316

SUMMARY OF INVENTION

Technical Problem

The present disclosure provides a magnetic piece with an adhesive agent which is excellent in preventing reduction of the magnetic flux density, a multilayer magnetic piece which includes the magnetic piece, a multilayer packet and a multilayer core, and a manufacturing method of the magnetic piece.

Solution to Problem

A magnetic piece of the present disclosure includes: a soft magnetic amorphous alloy ribbon; and a resin layer provided on at least one surface of the soft magnetic amorphous alloy ribbon, wherein a resin whose Shore D hardness is not more than 60 is used for the resin layer.

Preferably, a resin whose Shore D hardness is not more than 25 is used for the resin layer. Preferably, a resin whose Shore D hardness is not less than 1 is used for the resin layer.

The resin may contain a polyester resin as a major constituent.

The resin may further contain a polystyrene resin.

The resin may contain the polystyrene resin in the proportion of not less than 1 mass % relative to the polyester resin.

The magnetic piece may have a magnetic flux density (B80) of not less than 1.48 T.

The resin layer may have a thickness of not less than 0.5 µm and not more than 1.45 µm.

The soft magnetic amorphous alloy ribbon may have a thickness of not less than 10 µm and not more than 50 µm.

The soft magnetic amorphous alloy ribbon may be made of an alloy which has such a composition that Si is not less than 0 atomic % and not more than 10 atomic % and B is not less than 10 atomic % and not more than 20 atomic % where the total of Fe, Si and B is 100 atomic %.

A multilayer magnetic piece of the present disclosure includes a multilayer structure consisting of a plurality of the magnetic pieces as set forth in any of the foregoing paragraphs.

A multilayer core of the present disclosure includes a roll or multilayer structure of the magnetic piece as set forth in any of the foregoing paragraphs.

A multilayer core of the present disclosure includes a multilayer structure consisting of a multilayer magnetic piece and at least one electromagnetic steel plate, the multilayer magnetic piece including a multilayer structure consisting of a plurality of the magnetic pieces as set forth in any of the foregoing paragraphs.

The multilayer core may further include a resin layer between the multilayer magnetic piece and the at least one electromagnetic steel plate, the resin layer containing a resin whose Shore D hardness is not more than 60.

A multilayer packet of the present disclosure includes: a multilayer magnetic piece which includes a multilayer structure consisting of a plurality of the magnetic pieces as set forth in any of the foregoing paragraphs; and at least one electromagnetic steel plate provided on at least part of an end surface in a stacking direction of the multilayer magnetic piece.

The multilayer packet may further include a resin layer between the electromagnetic steel plate and the multilayer magnetic piece, the resin layer containing a resin whose Shore D hardness is not more than 60.

A magnetic piece manufacturing method of the present disclosure includes: providing a soft magnetic amorphous alloy ribbon; and applying an adhesive agent onto at least one surface of the soft magnetic amorphous alloy ribbon, the adhesive agent containing a resin whose Shore D hardness is not more than 60 and a solvent.

The resin may contain a polyester resin as a major constituent.

The resin may further contain a polystyrene resin in the proportion of not less than 1 mass % relative to the polyester resin.

The resin may have a glass transition temperature equal to or lower than 30° C.

Advantageous Effects of Invention

According to the present disclosure, a resin layer is formed of a resin whose Shore D hardness is not more than 60 on at least one surface of a soft magnetic amorphous alloy ribbon, resulting in a magnetic piece, a multilayer magnetic piece, a multilayer core and a multilayer packet which have excellent magnetic flux densities.

BRIEF DESCRIPTION OF DRAWINGS

FIG. 23(A) is a plan view of the multilayer packet placed on a horizontal table surface and viewed down from above in the stacking direction. FIG. 23(B) is a side view of the multilayer packet, which is viewed from a lateral side.

DESCRIPTION OF EMBODIMENTS

The inventors of the present application conducted detailed research on a magnetic piece with an adhesive agent such as disclosed in Patent Document No. 1. It has been known that amorphous alloy ribbons have large magnetostriction. Therefore, in producing a multilayer structure by applying an adhesive agent between layers, the volume of the adhesive agent reduces when the adhesive agent cures, and if adhered by heating, the adhesive agent causes compressive stress on the amorphous alloy ribbon mainly in the in-plane direction due to the difference in thermal expansion coefficient between the amorphous alloy ribbon and the adhesive agent. As a result, the magnetic flux density in the presence of a predetermined applied magnetic field decreases. If the magnetic flux density in the presence of a predetermined applied magnetic field decreases, the noise resulting from magnetic excitation of an AC core increases.

This compressive stress varies depending on the type of a resin which is a constituent of the adhesive agent. That is, it was found that the magnetic properties, particularly the magnetic flux density B80, can largely vary depending on the type of resin layers for layer stacking. Based on this finding, the inventors of the present application conceived a novel magnetic piece.

B80 represents a magnetic flux density (T) which is achieved when magnetized with a magnetic field of 80 A/m. Br (described later) represents a residual magnetic flux density (T) which is achieved when magnetized with a magnetic field of 80 A/m and thereafter the magnetic field is changed to 0 A/m.

Hereinafter, embodiments of a magnetic piece, a multilayer magnetic piece, a multilayer core, a multilayer packet, and a manufacturing method of the magnetic piece of the present disclosure are described in detail.

First Embodiment

Figure 1:
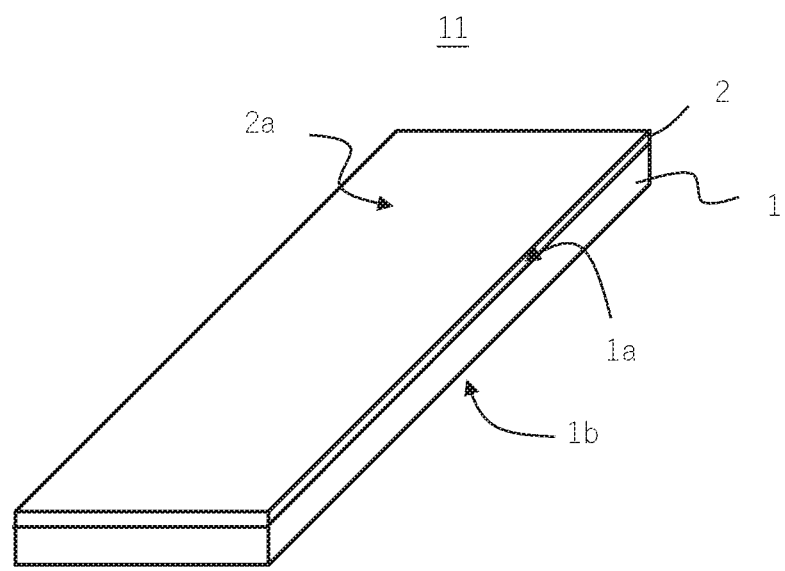
FIG. 1 is a perspective view showing an example of an embodiment of a magnetic piece.

FIG. 1 is a schematic perspective view showing one embodiment of a magnetic piece of the present disclosure. Note that the forms shown in the drawings are merely schematic and are not necessarily coincident with the actual dimensions. A magnetic piece 11 of the present disclosure includes a soft magnetic amorphous alloy ribbon 1 and a resin layer 2 provided on at least one surface of the soft magnetic amorphous alloy ribbon 1. The magnetic piece 11 preferably has a magnetic flux density B80 of 1.48 T or higher. The soft magnetic amorphous alloy ribbon 1 can be selected from soft magnetic amorphous alloy ribbons which have various compositions suitable to cores (magnetic cores) for power distribution and for transformers and cores for electronic/electric circuits.

For example, the soft magnetic amorphous alloy ribbon 1 has such a composition that, where the total amount of Fe, Si and B is 100 atomic %, Si is not less than 0 atomic % and not more than 10 atomic %, B is not less than 10 atomic % and not more than 20 atomic %, and the remainder is Fe. If the amount of Si and the amount of B are outside these ranges, it is difficult to produce an amorphous alloy by roll cooling or the mass productivity is likely to decrease. The soft magnetic amorphous alloy ribbon 1 may contain elements other than Fe, Si and B, for example, Mn, S, C, Al or the like, as additives or unavoidable impurities. The soft magnetic amorphous alloy ribbon 1 preferably has the above-described composition and is an amorphous (non-crystalline) ribbon which does not have a crystalline structure. The amount of Si is preferably not less than 3 atomic % and not more than 10 atomic %. The amount of B is preferably not less than 10 atomic % and not more than 15 atomic %. To achieve high B80, the amount of Fe is preferably not less than 78 atomic %, more preferably 79.5 atomic %, still more preferably 80 atomic %, and still more preferably 81 atomic %. While the soft magnetic amorphous alloy ribbon 1 can contain additives or unavoidable impurities, the proportion of Fe, Si and B is preferably not less than 95 mass %, more preferably not less than 98 mass %. Less than 50% atoms of Fe may be substituted with Co or Ni.

The soft magnetic amorphous alloy ribbon 1 has the shape of a thin band (bar) or a predetermined shape cut off from the band. FIG. 1 shows an example of the predetermined shape cut off from the band. When the soft magnetic amorphous alloy ribbon 1 has a band shape, the soft magnetic amorphous alloy ribbon 1 may be rolled up in the shape of a coil. In the case of a band shape, it can be cut off according to the purpose of use.

The width of the soft magnetic amorphous alloy ribbon 1 is not particularly limited but can be, for example, not less than 100 mm. If the width of the ribbon is not less than 100 mm, a practical transformer can be suitably manufactured. More preferably, the width of the ribbon is not less than 125 mm. Meanwhile, the upper limit of the width of the ribbon is not particularly limited. However, for example, if it exceeds 300 mm, the resultant ribbon sometimes does not have a uniform thickness in the width direction, and as a result, the shape is not uniform. Thus, there is a probability that the ribbon will be partially brittle or the magnetic flux density B80 will decrease. More preferably, the width of the ribbon is not more than 275 mm.

The thickness of the soft magnetic amorphous alloy ribbon 1 is preferably not less than 10 μm and not more than 50 μm. If the thickness is less than 10 μm, the mechanical strength of the soft magnetic amorphous alloy ribbon 1 is likely to be insufficient. The thickness is more preferably not less than 15 μm, still more preferably not less than 20 μm. If the thickness of the ribbon exceeds 50 μm, it is likely to be difficult to stably achieve an amorphous phase. The thickness is more preferably not more than 35 μm, still more preferably not more than 30 μm.

The soft magnetic amorphous alloy ribbon 1 does not have anisotropy derived from the crystalline structure and has no grain boundary which can interrupt movement of a magnetic domain wall, and therefore have excellent soft magnetic properties of high magnetic permeability and small loss although a high magnetic flux density is achieved. It is also preferred that the soft magnetic amorphous alloy ribbon 1 solely has a magnetic flux density B80 of 1.48 T or higher.

The surface roughness (arithmetic mean roughness Ra measured in compliance with JIS B0601-2001) of the amorphous alloy ribbon 1 is preferably in the range of 0.20 μm to 0.50 μm, more preferably in the range of 0.20 μm to 0.40 μm.

If the surface roughness Ra is not less than 0.20 μm, it is advantageous from the viewpoint of securing insulation between the layers of a multilayer structure of the amorphous alloy ribbon. If the surface roughness Ra is not more than 0.40 μm, it is advantageous from the viewpoint of increasing the area occupancy of the multilayer core.

Further, the magnetic piece of the present disclosure has such a collateral effect that increase of the coercivity of a magnetic piece to be produced can be suppressed. Since increase of the core loss which is attributed to increase of the coercivity can be suppressed, the magnetic piece of the present disclosure can secure a competitive advantage over the other soft magnetic pieces.

The soft magnetic amorphous alloy ribbon 1 can be produced by various known methods. For example, the soft magnetic amorphous alloy ribbon 1 can be produced by providing a molten alloy which has the above-described composition; ejecting the molten alloy onto the surface of a cooling roll, thereby forming a film of the molten alloy over the surface of the cooling roll; blowing a peeling gas against the amorphous alloy ribbon formed over the surface, thereby peeling the amorphous alloy ribbon off from the surface of the cooling roll; and rolling up the amorphous alloy ribbon in the form of a roll using a rolling-up roll.

The resin layer 2 is provided on at least one of two major surfaces 1a, 1b of the soft magnetic amorphous alloy ribbon 1. In FIG. 1, the resin layer 2 is provided on the major surface 1a. The resin layer 2 is made of a resin whose Shore D hardness is not more than 60. Since the resin layer 2 is used for joining with other magnetic pieces, the resin is preferably a thermoplastic resin. In the present disclosure, the Shore D hardness refers to the type D durometer hardness. The durometer hardness means a hardness measured using a durometer hardness tester, where a type D indenter is pressed against a test piece surface with a predetermined spring force, and the hardness is determined based on the depth of the indentation formed by the indenter. The durometer hardness refers to a value measured by a test method stipulated in JIS K6253. If the Shore D hardness of the resin is not more than 60, B80 of a resultant multilayer magnetic piece is not less than 90% of that of a multilayer structure without a resin layer.

The upper limit of the Shore D hardness is preferably 40, more preferably 30, still more preferably 25. The lower limit of the Shore D hardness is preferably 1, more preferably 3, still more preferably 10, and still more preferably 15. When the Shore D hardness of the resin used is within these ranges, B80 of a resultant multilayer magnetic piece is still higher.

The Shore D hardness of the resin contained in the resin layer 2 cannot be precisely measured in the form of the magnetic piece 11. In this specification, the Shore D hardness of the resin contained in the resin layer 2 means a value measured according to the above-described test method while the resin layer 2 is solely present before being provided on the soft magnetic amorphous alloy ribbon 1, i.e., a value as the physical property of the resin. That is, the resin layer 2 contains the resin, and this resin has a Shore D hardness of not more than 60 as a solely-measured physical property.

The resin layer 2 is formed by providing a resin in layers on at least one surface of the soft magnetic amorphous alloy ribbon. Specifically, the resin layer 2 is formed by preparing an adhesive agent which contains the resin and a solvent, applying the adhesive agent, and thereafter evaporating the solvent. The resin used has a Shore D hardness of not more than 60 as previously described. A preferred range of the Shore D hardness of the adhesive agent which contains this resin and the solvent is the same as that described above. Further, as will be described later, the resin may contain a polyester resin as the major constituent. The resin may further contain a polystyrene resin in the proportion of not less than 1 mass % relative to the polyester resin. As will be described later, a resin whose glass transition temperature is equal to or lower than 30° C. can be used.

The resin layer 2 is preferably adhered to at least one of the major surfaces 1a, 1b of the soft magnetic amorphous alloy ribbon 1 in order to prevent separation. The resin layer 2 may be provided on each of two major surfaces 1a, 1b of the soft magnetic amorphous alloy ribbon 1. The formation method of the resin layer can be a known method, for example, applying the above-described adhesive agent using a spray or coater. The resin layer 2 may be provided over the entirety of the major surfaces 1a, 1b or may be provided on the major surfaces 1a, 1b in a predetermined pattern including regions in which the resin layer 2 is to be provided and regions in which the resin layer 2 is not to be provided, for example, in a pattern of stripes, dots, etc.

After magnetic pieces 11 of a predetermined shape are stacked up, or after the magnetic piece 11 is rolled up in the shape of a coil, heat is applied with pressure such that the resin layer 2 is softened (thermocompression bonding). Thereby, a major surface 2a of the resin layer 2 comes into contact with another part of the magnetic piece 11 or with the major surface 1b of another soft magnetic amorphous alloy ribbon 1 and, in this state, the resin layer is cooled till it cures, so that the resin layer 2 joins together the rolled soft magnetic amorphous alloy ribbon 1 or the stacked soft magnetic amorphous alloy ribbons 1 of the magnetic piece 11. The magnetic piece 11 of a predetermined shape may be realized by cutting the soft magnetic amorphous alloy ribbon into a predetermined shape and then forming a resin layer or by forming a resin layer on a band-like soft magnetic amorphous alloy ribbon and then cutting it into a predetermined shape.

Based on this research, the present inventors found that, in a multilayer magnetic piece or multilayer core produced by stacking or rolling up of the magnetic piece 11, the magnetic flux density can vary as the Shore D hardness of the resin used or the resin layer 2 to be formed varies even though the thickness of the resin layer 2 is equal. Specifically, the present inventors found that, as the Shore D hardness of the resin used or the resin layer 2 to be formed increases, the magnetic flux density of the multilayer magnetic piece or multilayer core decreases. The specific reasons for this are not elucidated but can be estimated as follows. In softening the resin layer 2 such that two adjoining soft magnetic amorphous alloy ribbons 1 are joined together, the resin layer 2 and the soft magnetic amorphous alloy ribbons 1 undergo expansion/shrinkage due to heat and, as a result, the resin layer 2 causes stress on the soft magnetic amorphous alloy ribbons 1. As the Shore D hardness of the resin layer 2 increases, this stress also increases. Thus, it is estimated that since the amorphous alloy has large magnetostriction, this stress causes an undesirable magnetic anisotropy so that the magnetic flux density can decrease.

As will be described below, if the Shore D hardness of the resin used or the resin layer 2 to be formed is not more than 60, the magnetic flux density B80 of the multilayer magnetic piece or multilayer core produced from the magnetic piece 11 is not less than 90%, or not less than 93%, of that of a multilayer structure or roll consisting only of the soft magnetic amorphous alloy ribbon without inclusion of the resin layer 2. That is, decrease of the magnetic flux density B80 which is attributed to stacking and firm adhesion can be suppressed. It is generally known that an amorphous alloy has large magnetostriction, particularly a Fe-based amorphous alloy has large magnetostriction of about 30 ppm and therefore has extremely high stress susceptibility, and even a very small stress can deteriorate its magnetic flux density. Thus, after the resin is applied and the magnetic pieces are stacked and firmly adhered, the magnetic flux density B80 is lower than that achieved when the resin is not applied. As B80 decreases, the noise increases. As the Shore D hardness of the resin used or the resin layer 2 to be formed decreases, the magnetic flux density B80 of the multilayer magnetic piece or multilayer core produced from the magnetic piece 11 is more likely to increase (decrease of B80 is suppressed). Therefore, when a high magnetic flux density B80 is needed, it is preferred that the Shore D hardness of the resin used or the resin layer 2 to be formed is small. Although the lower limit value of the Shore D hardness is not particularly limited, if the Shore D hardness is excessively small, B80 is sometimes small. Further, sometimes, a sufficient strength for the adhesive agent is not achieved. Therefore, it is preferred that the Shore D hardness of the resin used or the resin layer 2 to be formed is not less than 1.

The resin used preferably has a glass transition temperature equal to or lower than 30° C. In this case, a multilayer magnetic piece of high B80 can be produced. This is because, in our estimation, if the glass transition temperature is equal to or lower than 30° C., cooling to room temperature after the thermocompression bonding would not cause glass transition, and the resin layer 2 is still soft so that the stress is suppressed.

The thickness of the resin layer 2 is, preferably, not less than 0.5 μm and not more than 1.45 μm. If the resin layer is thick, the stress on the soft magnetic amorphous alloy ribbon is large and, therefore, the magnetic flux density B80 of the multilayer magnetic piece or multilayer core is likely to decrease. The effectual magnetic flux density which can be used in a multilayer magnetic piece or multilayer core produced from the magnetic piece 11 is represented by the product of the area occupancy of the soft magnetic amorphous alloy ribbon 1 and the saturation magnetic flux density. From the viewpoint of increasing the volume fraction of the magnetic piece 11 in the multilayer magnetic piece or core, the thickness of the resin layer 2 cannot be greatly increased. For these reasons, it is preferred that the thickness of the resin layer is not more than 1.45 μm. On the contrary, if the resin layer 2 is excessively thin, there is a probability that the adhesion strength cannot be sufficiently achieved. Thus, the thickness of the resin layer is preferably not less than 0.5 μm. The upper limit of the thickness of the resin layer is preferably 1.40 μm, more preferably 1.3 μm. The lower limit of the thickness of the resin layer is preferably 0.7 μm, more preferably 1.0 μm. When the resin layer 2 is provided on both the major surface 1a and the major surface 1b of the soft magnetic amorphous alloy ribbon 1, it is preferred that the total thickness of the resin layer 2 on the major surface 1a and the resin layer 2 on the major surface 1b is within the previously-described range. From the viewpoint that it is not necessary to distinguish the front and the rear, it is preferred that the resin layer 2 on the major surface 1a and the resin layer 2 on the major surface 1b have equal thicknesses.

The resin used or the resin layer 2 may contain any type of polymer as the major constituent so long as the Shore D hardness is within the above-described range. The Shore D hardness of the resin layer 2 depends on the Shore D hardness of a polymer resin contained as the major constituent. The Shore D hardness of the polymer resin can be adjusted according to the chemical structure of the repetition unit of the polymer, the molecular weight of the polymer, the proportion of cross-links, etc. For example, a polyester resin is an example of a polymer resin which can be suitably used as the major constituent (the constituent which has the highest mass proportion in the resin component) and can have a Shore D hardness of about 3-80 by adjusting the chemical structure, the molecular weight, etc. Alternatively, a polyimide resin, a polyethylene resin, a nitrile rubber, an epoxy resin, a denatured olefin resin, or the like, can be used as the major constituent of the resin layer 2. For the resin, it is preferred that the magnetic flux density B80 of the magnetic piece after being applied and dried is large, the stickiness of the exposed surface of the resin layer after being applied and dried is extremely small, and the stickiness revives by application of heat. Among the aforementioned resins which has these characteristics, a resin containing a polyester resin as the major constituent is particularly preferred.

The resin used or the resin layer 2 may contain a secondary constituent and/or unavoidable impurities in addition to the above-described major constituent. For example, the resin layer 2 may contain a cross-linking agent of melamine or the like as a secondary constituent. The resin layer 2 may contain polystyrene as a secondary constituent. For example, when a magnetic piece 11 which is rolled up in the shape of a coil or stacked into a multilayer structure is stored, the magnetic pieces 11 sometimes adhere to each other and it is difficult to separate them even before the thermocompression bonding. In such a case, the resin used or the resin layer 2 may contain, for example, a polystyrene resin as a secondary constituent. In this case, the stickiness (tackiness) of the major surface of the resin layer 2 before the thermocompression bonding can be suppressed.

Particularly when the major constituent of the resin used or the resin layer is a polyester resin, the resin or the resin layer preferably contains a polystyrene resin as a secondary constituent. As compared with a case where polysiloxane or the like is used as a secondary constituent, decrease of the adhesion strength between the magnetic pieces is easily suppressed, and the stickiness before the thermocompression bonding can be suppressed.

For example, the amount of the contained polystyrene resin can be in the proportion of not less than 1 mass % relative to the polyester resin. The polystyrene resin has a relatively small relative density and therefore gathers near the major surface 2a of the resin layer 2 in producing the magnetic piece 11. The polystyrene resin includes only hydrogen in the side chain relative to the main chain of carbon and therefore has small polarity. Thus, as being located on the major surface 2a of the resin layer 2, the stickiness of the major surface 2a of the resin layer 2 can be suppressed. If the amount of the polystyrene resin relative to the polyester resin is less than 1 mass %, the effect of suppressing the stickiness is not sufficient. The lower limit value of the amount of the polystyrene resin is preferably not less than 3 mass %, more preferably 6 mass %. Although the amount of the polystyrene resin needs to be smaller than the amount of the polyester resin, if the amount of the polystyrene resin is greater than the amount of the polyester resin by 30 mass %, B80 is likely to decrease. If it is not more than 30 mass %, for example, B80 of a resultant multilayer magnetic piece is not less than 93% of B80 of a multilayer magnetic piece in which the resin layer is not used. The upper limit value of the amount of the polystyrene resin is preferably 25 mass %, more preferably 20 mass %, and still more preferably 15 mass %. The amount of the contained polyester resin and the amount of the contained polystyrene resin can be calculated by gas chromatography or IR spectroscopy (infrared spectroscopy) from the resin layer dissolved in an appropriate solvent. In the case where, for example, a resin containing two types of resins, polystyrene resin and polyester resin, is analyzed in the IR spectroscopy, the amount of the contained polystyrene resin can be calculated based on the ratio between the intensities of the spectra at the frequencies of 1510 $cm^{-1}$ and 1370 $cm^{-1}$ (1510 $cm^{-1}$/1370 $cm^{-1}$).

A method for manufacturing the magnetic piece 11 is described. The magnetic piece 11 can be manufactured by providing a resin layer 2 on a soft magnetic amorphous alloy ribbon 1. Specifically, the magnetic piece 11 can be produced by providing a soft magnetic amorphous alloy ribbon and applying an adhesive agent, which contains a resin whose Shore D hardness is not more than 60 and a solvent, onto at least one surface of the soft magnetic amorphous alloy ribbon 1. Preferably, after the adhesive agent is applied, at least part of the solvent is evaporated.

Firstly, a soft magnetic amorphous alloy ribbon 1 which has the above-described composition is provided. The soft magnetic amorphous alloy ribbon 1 may have a shape of great length rolled up in the shape of a coil or may be cut into a predetermined shape.

Next, application of the resin is described. The major constituent of the resin and a secondary constituent, which is provided when necessary, are dissolved into an appropriate solvent of ethyl acetate, toluene, methyl ethyl ketone, or the like, whereby a thermoplastic adhesive agent is prepared. So long as a homogeneous resin layer 2 can be formed, the major constituent and the secondary constituent do not need to be completely dissolved into the solvent but may be dispersed in the solvent. The ratio of the major constituent and the secondary constituent to the solvent can be adjusted such that the adhesive agent has an appropriate density for it to be provided on the soft magnetic amorphous alloy ribbon 1. The prepared adhesive agent is applied onto the soft magnetic amorphous alloy ribbon 1 using a coater or the like.

After the adhesive agent is applied, the solvent is evaporated from the adhesive agent. For example, the soft magnetic amorphous alloy ribbon 1 with the adhesive agent applied thereto is heated at a temperature equal to or higher than 80° C. and equal to or lower than 200° C. for a duration of not less than one minute and not more than 30 minutes, whereby the solvent is evaporated. Thereby, the solvent is removed from the adhesive agent, and the resin is applied onto the major surface 1a of the soft magnetic amorphous alloy ribbon 1. As a consequence, a magnetic piece 11 which includes the resin layer 2 is realized.

After the solvent is evaporated, the resin layer 2 is adhered with a small force to the major surface 1a of the soft magnetic amorphous alloy ribbon 1.

Since the magnetic piece 11 includes the resin layer 2 that is formed by applying a resin whose Shore D hardness is not more than 60 onto at least one surface of the soft magnetic amorphous alloy ribbon 1, when a multilayer magnetic piece or core is produced by stacking or rolling up the magnetic piece 11 and carrying out thermocompression bonding, a high magnetic flux density B80 of not less than 90%, or not less than 93%, of that achieved without the resin layer 2 can be realized. Further, when the resin layer 2 contains a polystyrene resin as a secondary constituent, a magnetic piece 11 can be realized whose surface hardly has adhesiveness before the thermocompression bonding and which is excellent in handleability.

Second Embodiment

Figure 2:
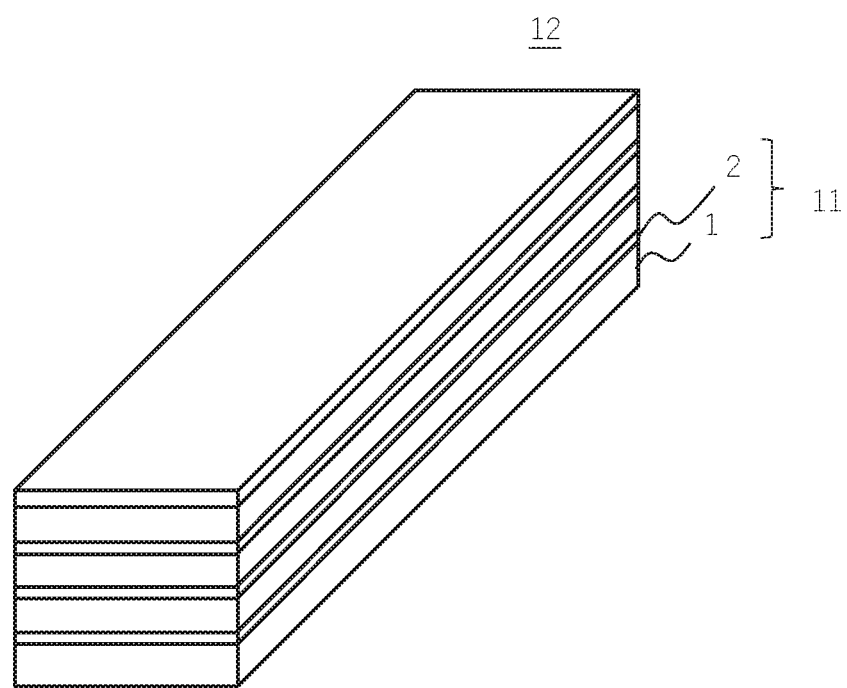
FIG. 2 is a perspective view showing an example of an embodiment of a multilayer magnetic piece.

FIG. 2 is a schematic perspective view showing one embodiment of a multilayer magnetic piece of the present disclosure. The multilayer magnetic piece 12 of the present disclosure includes a plurality of soft magnetic amorphous alloy ribbons 1 and resin layers 2 provided between the plurality of soft magnetic amorphous alloy ribbons 1.

The multilayer magnetic piece 12 is manufactured by stacking up a plurality of the magnetic pieces 11 of the first embodiment and combining the magnetic pieces 11 together by thermocompression bonding. For the thermocompression bonding, for example, the means of holding the multilayer structure at a temperature equal to or higher than 80° C. and equal to or lower than 200° C. with a pressure of not less than 0.1 MPa and not more than 0.4 MPa applied in a stacking direction by a press machine for a duration of not less than 1 minute and not more than 15 minutes (thermocompression bonding) can be employed. Thereby, the resin layer 2 is softened so as to enter minute recesses in the major surface 1b of the soft magnetic amorphous alloy ribbon 1 of another magnetic piece 11 that is present on the major surface 1a of the soft magnetic amorphous alloy ribbon and the resin layer 2. Thereafter, the multilayer structure is cooled to room temperature and removed from the press machine, resulting in a multilayer magnetic piece 12. Thereby, a multilayer magnetic piece 12 is produced in which a plurality of magnetic pieces 11 are stacked up and integrated.

Thereafter, when necessary, annealing can be performed for strain removal. By the annealing, the strain imposed on the soft magnetic amorphous alloy ribbon 1 by the thermocompression bonding is eased so that the core loss can be reduced. The annealing may be realized by a heat treatment on the multilayer magnetic piece. Alternatively, a multilayer core which will be described later may be annealed. The maximum temperature of the annealing is preferably equal to or higher than 100° C. and equal to or lower than 200° C. If it is equal to or higher than 100° C., the effect of improving the magnetic properties can be sufficiently achieved. If it is equal to or lower than 200° C., melting of the resin layer can be suppressed. The lower limit of the maximum temperature is more preferably 110° C. The duration of the heat treatment at the maximum temperature is preferably not less than 0.1 h and not more than 20 h. If it is not less than 0.1 h, the effect of improving the magnetic properties can be sufficiently achieved. If it is not more than 20 h, melting of the resin layer can be suppressed, and the manufacture time can be shortened.

A soft magnetic amorphous alloy ribbon which is heat-treated such that the direction of easy magnetization is identical with the longitudinal direction of the ribbon is effective as a ribbon for transformers. Preferred examples of the method for producing such a soft magnetic amorphous alloy ribbon includes carrying out a heat treatment on the ribbon which is tightly stretched under tension (tension annealing), carrying out a heat treatment on the ribbon in the presence of a magnetic field applied in the longitudinal direction of the ribbon, and carrying out a heat treatment on the ribbon which is tightly stretched under tension in the presence of a magnetic field applied in the longitudinal direction of the ribbon. A resin layer is formed on the soft magnetic amorphous alloy ribbon on which such a heat treatment has been performed, whereby a magnetic piece is produced.

In the multilayer magnetic piece 12, a pair of adjoining soft magnetic amorphous alloy ribbons 1 are adhered together by an interposed resin layer 2. The resin layer 2 and each of the soft magnetic amorphous alloy ribbons 1 are strongly adhered together by a mechanical bond as compared with the magnetic piece 11. The amount of shrinkage of the soft magnetic amorphous alloy ribbon 1 and the amount of shrinkage of the resin layer 2 which are attributed to the difference in temperature between the holding temperature and the room temperature in the thermocompression bonding are different, so that the resin layer 2 can cause stress on the soft magnetic amorphous alloy ribbon 1. However, since the Shore D hardness of the resin layer 2 is not more than 60, the stress on the soft magnetic amorphous alloy ribbon 1 is relatively small. Therefore, in the multilayer magnetic piece 12, deterioration of the magnetic properties which is attributed to the stress, particularly decrease of the magnetic flux density, is suppressed. Therefore, a resultant multilayer magnetic piece 12 has a high magnetic flux density B80.

The multilayer magnetic piece 12 can be manufactured by stacking up, for example, about 2-50 sheets of the soft magnetic amorphous alloy ribbon 1 and can be suitably used as, for example, a core part for square transformers.

Third Embodiment

Figure 3:
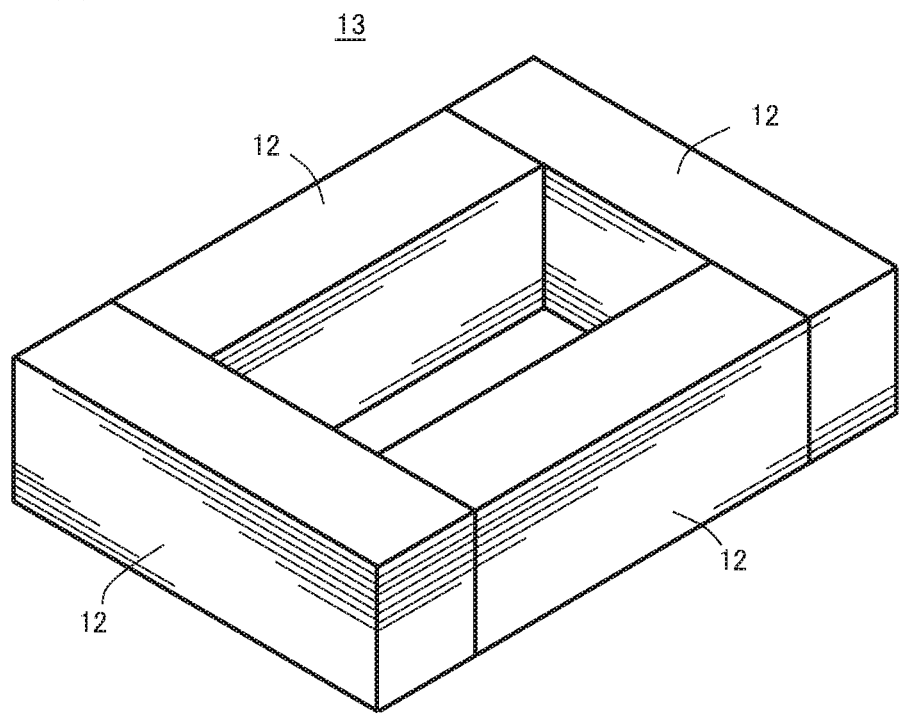
FIG. 3(A) and FIG. 3(B) are perspective views showing an example of an embodiment of a multilayer core.
Figure 3:
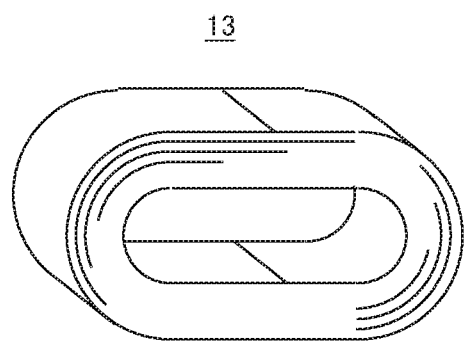

FIG. 3 is a schematic perspective view showing one embodiment of a multilayer core of the present disclosure for use in transformers. FIG. 3(a) shows a multilayer core 13 consisting of four multilayer magnetic pieces 12 combined in an annular arrangement. Note that a plurality of multilayer magnetic pieces 12 can be stacked up in the stacking direction and used as a magnetic path of this multilayer core. FIG. 3(b) is a multilayer core 13 produced by rolling up the magnetic piece 11 in the shape of a coil. Each of the multilayer cores is formed by the magnetic piece 11. The rolled-up multilayer core 13 includes a soft magnetic amorphous alloy ribbon 1 rolled up in the shape of a coil and a resin layer 2 provided between loops of the rolled-up soft magnetic amorphous alloy ribbon 1.

As described in the second embodiment, in the rolled-up multilayer core 13, a mechanical bond is formed at the interface between the soft magnetic amorphous alloy ribbon 1 and the resin layer 2 by thermocompression bonding, and an inner loop of the soft magnetic amorphous alloy ribbon 1 and a loop which is present outside the inner loop are joined together by the resin layer 2.

In the multilayer core 13, the soft magnetic amorphous alloy ribbon 1 is adhered by the resin layer 2 that is made of a resin whose Shore D hardness is not more than 60 and, therefore, decrease of the magnetic flux density due to the stress can be suppressed. Thus, the magnetic flux density B80 of the multilayer core 13 is high.

Fourth Embodiment

Hereinafter, another embodiment of the multilayer core is described.

Another embodiment of the multilayer core is a multilayer core produced by stacking up a plurality of magnetic pieces and at least one electromagnetic steel plate. In this embodiment, the multilayer core can be a multilayer structure consisting of a plurality of multilayer packets in which an electromagnetic steel plate is provided on at least part of opposite end surfaces in the stacking direction of the multilayer magnetic piece. The electromagnetic steel plate is preferably provided on at least part of opposite end surfaces in the stacking direction of the multilayer magnetic piece and may be provided on an approximate entirety of the end surfaces. Herein, the end surfaces in the stacking direction refer to the lowermost one and the uppermost one of the major surfaces of the plurality of stacked magnetic pieces, i.e., the upper surface and the lower surface.

A resin whose Shore D hardness is not more than 60 can also be applied between the magnetic piece and the electromagnetic steel plate and between the multilayer magnetic piece and the electromagnetic steel plate for forming resin layers. Thereafter, by thermocompression bonding, not only the magnetic pieces but also the magnetic piece and the electromagnetic steel plate, and the multilayer magnetic piece and the electromagnetic steel plate, are mechanically secured together by the resin layers. Thereby, likewise as the effects in the multilayer magnetic piece, a multilayer packet or multilayer core which has a high magnetic flux density B80 can be produced.

In another embodiment of the multilayer core, a multilayer core of a closed magnetic path is formed by a plurality of core blocks. This core block can be produced by stacking up a plurality of multilayer packets.

If the shape of the multilayer core is quadrilateral (square or rectangular), the core blocks refer to structural parts which form four sides of the quadrilateral and include a multilayer structure consisting of a plurality of multilayer packets which are temporarily fastened and secured together by a clamp or the like and a multilayer structure consisting of a plurality of multilayer packets which are secured together using a resin or the like.

Since in the multilayer core the core blocks are formed using a plurality of multilayer packets, not only easy handling of an extremely thin magnetic piece but also great improvement in work efficiency in assemblage into a multilayer core of arbitrary shape and size can be achieved. That is, the multilayer core is built using a multilayer magnetic piece produced by stacking up a plurality of magnetic pieces, or a multilayer packet in which an electromagnetic steel plate is placed on at least part of the end surfaces in the stacking direction of the multilayer magnetic piece, as a single unit. As such, arbitrary shape and size the multilayer core is required to have can be realized, and the stacking accuracy in manufacture and the strength which is necessary for the magnetic piece can be stably secured.

Alternatively, the multilayer packet can have such a configuration that a multilayer magnetic piece and an electromagnetic steel plate are secured at a layered surface.

The "layered surface" refers to a surface formed by an aggregate of lateral surfaces corresponding to the respective thicknesses of a plurality of amorphous alloy ribbons and electromagnetic steel plates which are stacked up into a multilayer structure.

As a specific structure for securing the multilayer magnetic piece and the electromagnetic steel plate, the method of securing with a resin layer applied onto the layered surface extending from the multilayer magnetic piece to the electromagnetic steel plate (hereinafter, referred to as "layered-surface resin layer") can be employed.

As the resin layer to be placed on the layered surface, an epoxy-based resin can be used. In the multilayer packet, a plurality of magnetic pieces and electromagnetic steel plates which are constituents of the multilayer magnetic piece can stably maintain a desired shape for a long time when they are at least partially secured using an epoxy-based resin although, if they are simply stacked up, they have difficulty in keeping a predetermined shape due to misalignment.

Figure 24:
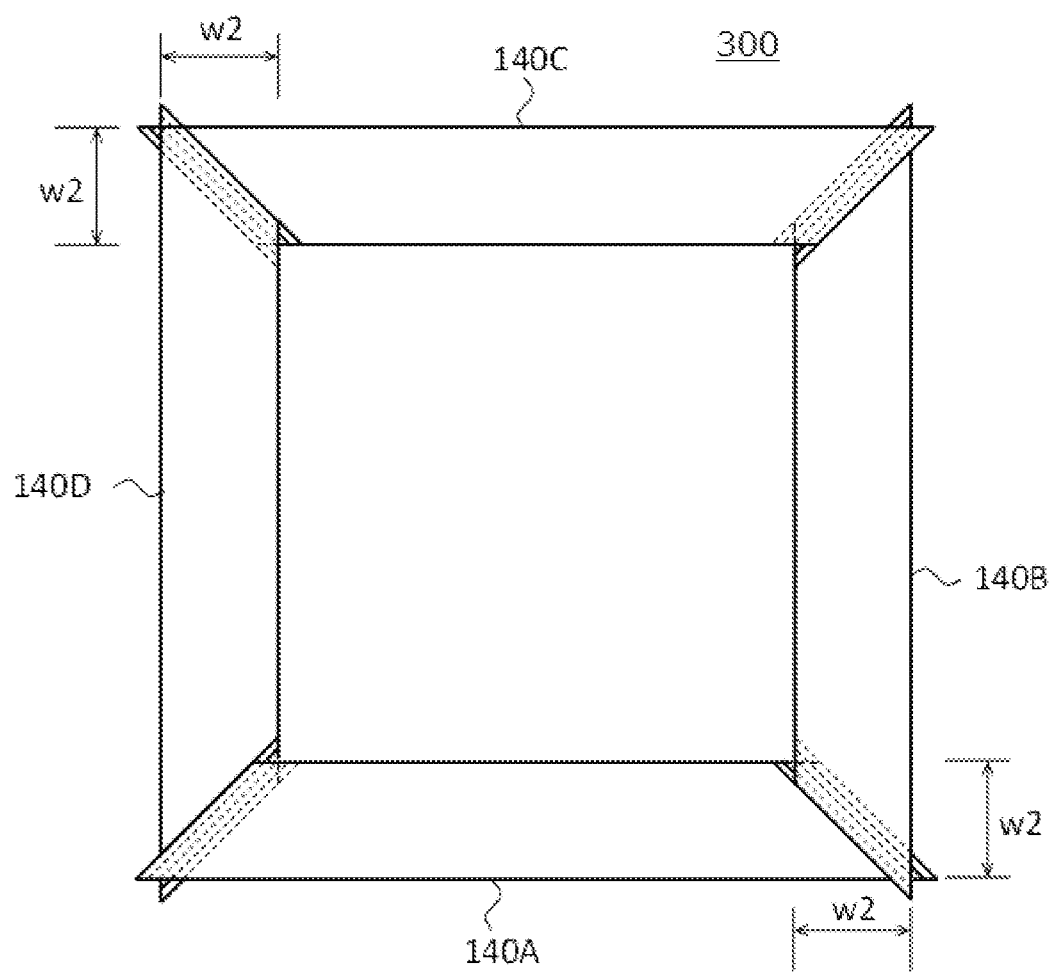
FIG. 24 is a plan view showing a multilayer core realized by joining together four multilayer packets which have joint portions of a step-lap structure.

As shown in FIG. 24, the multilayer core preferably has such a form that the closed magnetic path is formed by joining together four core blocks in the shape of a rectangular ring, the multilayer core has joint portions between two adjoining core blocks, at which end portions in the longitudinal direction of the core blocks of the multilayer packets of the respective core blocks are joined to each other, and the joint portions are joined together at stepped slope surfaces formed by inclining end portions of the multilayer magnetic piece of the multilayer packet at inclination angle θ with respect to the longitudinal direction and displacing the multilayer magnetic piece in the longitudinal direction. A specific structure will be described later.

The inclination angle θ at the end portion of the multilayer magnetic piece is more preferably 30° to 60° with respect to the longitudinal direction of the core blocks (i.e., the deflection angle of −15° to +15° with respect to) 45°.

For example, a core block of a closed magnetic path can be produced by joining together four multilayer packets in the shape of a rectangular ring. However, if the direction of easy magnetization of the multilayer magnetic piece is identical with the longitudinal direction and the multilayer magnetic piece has a rectangular shape, at the end portions in the longitudinal direction of the multilayer magnetic piece, the magnetic flux curves while it flows to another multilayer magnetic piece, and therefore, the magnetic flux flows in a direction different from the direction of easy magnetization, so that the iron loss and the apparent power are likely to increase. In the case of the above-described embodiment, even at the corners of the core blocks, the direction of the flowing magnetic flux and the direction of easy magnetization of the multilayer magnetic piece are likely to be identical, so that the energy loss can be suppressed to a low level.

Figure 18:
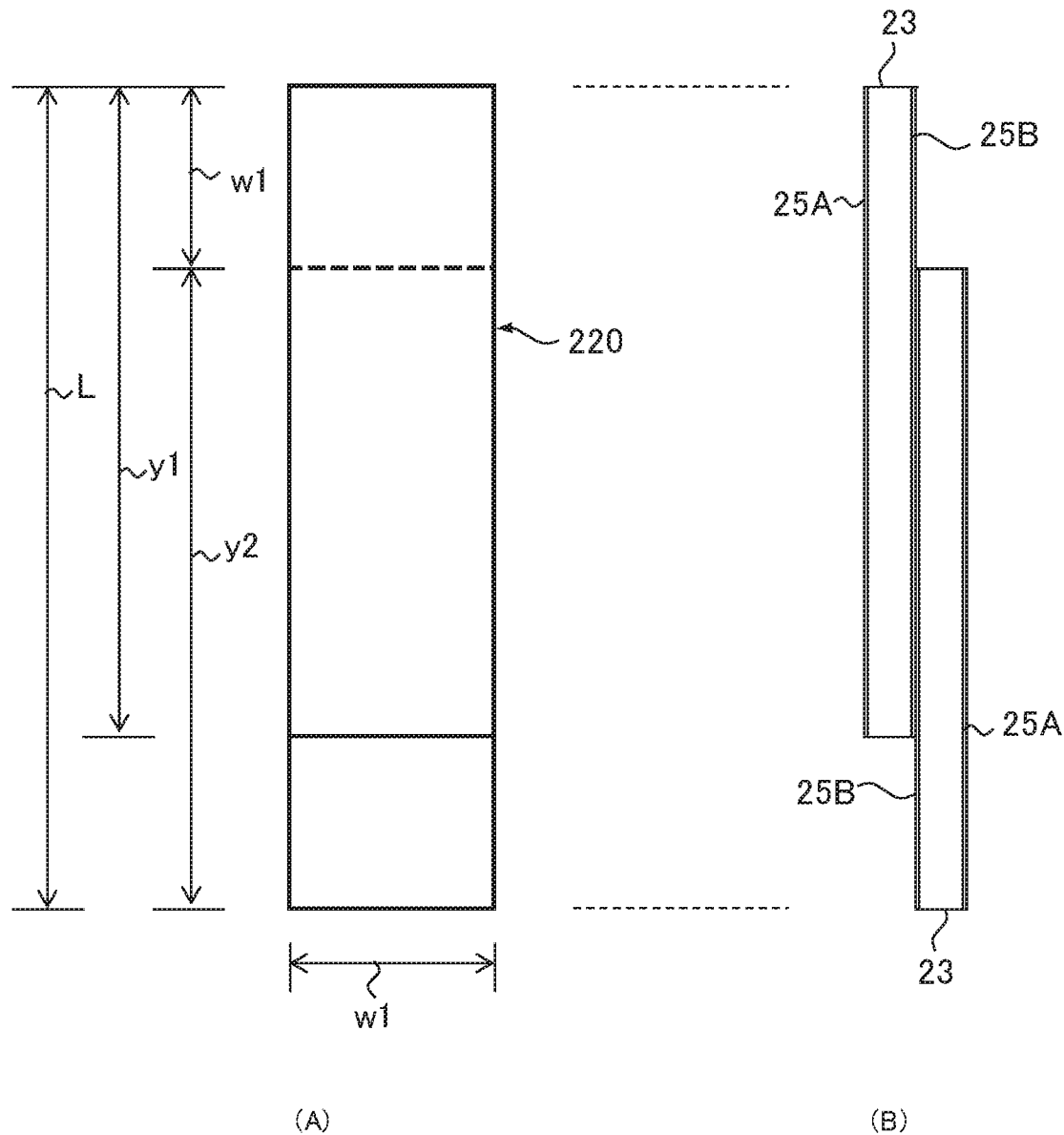
FIG. 18(A) is a general plan view of another example of an embodiment of the multilayer packet.
FIG. 18(B) is a general side view of FIG. 18(A).
Figure 19:
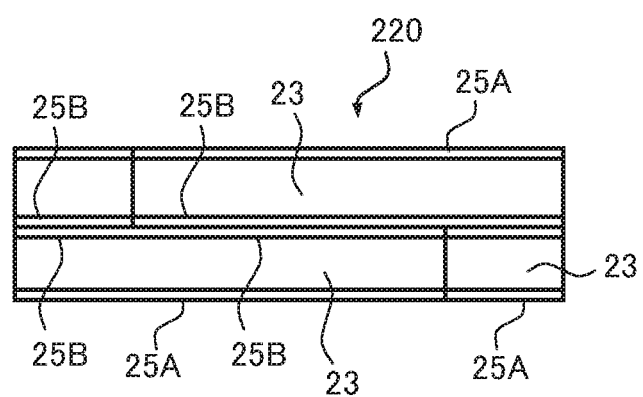
FIG. 19 is a general side view showing a form where a plurality of pieces of the multilayer packet of FIG. 18 are combined together.

The multilayer core has, as shown in FIG. 18 and FIG. 19, joint portions between two adjoining core blocks, where respective multilayer packets are joined together at end surfaces in the stacking direction. At the joint portions, the electromagnetic steel plate of the multilayer packet in one of the core blocks and the electromagnetic steel plate of the multilayer packet in the other core block are preferably arranged so as to oppose each other and to be in contact with each other.

At the joint portions, the end portions of two core blocks overlap each other, and therefore, if the electromagnetic steel plate of one core block and the electromagnetic steel plate of the other core block face each other, the slipperiness can be easily maintained, dislodgment and insertion of the multilayer packets between the core blocks are easy, and building up or disassembling of the multilayer core can be easily carried out.

An electromagnetic steel plate which is usually produced by cold rolling and thereafter forming a surface coating film has higher surface accuracy, i.e., smaller surface roughness, than an amorphous alloy ribbon formed by a liquid quenching method.

The absolute value of the difference between the surface roughness Ra of the electromagnetic steel plate and the surface roughness Ra of the magnetic piece is preferably not more than 0.4 μm, more preferably not more than 0.2 μm. If the absolute value of the difference in surface roughness Ra between the electromagnetic steel plate and the magnetic piece is not more than 0.2 μm, it is advantageous in that the area occupancy of the multilayer iron core can be increased.

In a multilayer core of an embodiment of the present disclosure, a multilayer packet includes two multilayer magnetic pieces, two first electromagnetic steel plates provided on respective ones of end surfaces of the two multilayer magnetic pieces facing away from each other, and a second electromagnetic steel plate interposed between the two multilayer structures, wherein the two multilayer magnetic pieces preferably have such a configuration that one end in the longitudinal direction of one multilayer magnetic piece and one end in the longitudinal direction of the other multilayer magnetic piece are displaced in the longitudinal direction from a position where they overlap each other in the longitudinal direction so that the two multilayer magnetic pieces partially overlap.

In such a form, handling of extremely thin magnetic pieces is easy, and joining of multilayer packets can be easily carried out. Further, since a core block is formed by multilayer packets which are stacked up beforehand, the stacking accuracy is excellent, and the productivity is also excellent.

The second electromagnetic steel plate provided between two multilayer magnetic pieces may be realized by a single electromagnetic steel plate of a size which can be provided over the entirety of the surface of the multilayer magnetic piece corresponding to the overall length in the longitudinal direction of the multilayer packet or may be realized by two electromagnetic steel plates of a size which can be provided over the entirety of the end surface of each of the two multilayer magnetic pieces.

In multilayer cores in such forms, the multilayer magnetic piece is preferably provided over the entirety in the transverse direction of the surface of the electromagnetic steel plate. Since the length in the transverse direction that is perpendicular to the longitudinal direction (width length) of a plurality of stacked magnetic pieces is equal to or greater than the length in the transverse direction that is perpendicular to the longitudinal direction (width length) of the electromagnetic steel plate, the electromagnetic steel plate does not protrude at the layered surface, and handling is easy and assemblage improves: for example, the layered surfaces of the multilayer magnetic pieces can be in close contact with each other. Further, the volume fraction of the soft magnetic amorphous alloy ribbon in the multilayer core increases, and the energy loss is suppressed to a lower level.

EXAMPLES

The resin layer was formed using various resin materials, and the magnetic piece was produced. The resultant magnetic pieces were stacked up to produce a multilayer magnetic piece. The characteristics of the multilayer magnetic piece were measured. The results of the measurement are described. Also, specific examples of a multilayer core in which a multilayer packet is used are described.

Example and Comparative Example 1

A magnetic piece was produced using a polyester resin of various Shore D hardnesses. The resultant magnetic pieces were stacked up to produce a multilayer magnetic piece. The magnetic flux density B80 of the multilayer magnetic piece was measured.

As shown in TABLE 1 below, adhesive agents containing six types of polyester resins a1, b2, b3, g1, h1, i1 were provided. The Shore D hardnesses of the respective polyester resins are as shown in the table. The concentration of the polyester resin in the adhesive agent was 30 mass %, and the remainder was a solvent.

A soft magnetic amorphous alloy ribbon of 200 mm in length, 25 mm in width, and 24.4 μm in thickness was provided. The composition of the soft magnetic amorphous alloy ribbon was Fe: 82 atomic %, Si: 4 atomic %, and B: 14 atomic % where the total of Fe, Si and B was 100 atomic %. Note that unavoidable impurities, such as Cu, Mn, etc., were not more than 0.5 mass %.

An adhesive agent containing a respective polyester resin was applied onto a soft magnetic amorphous alloy ribbon so as to have a thickness of 4 μm and held at 100° C. such that the solvent was evaporated, resulting in a magnetic piece. For each of the resins, four magnetic pieces were prepared. Thereafter, four soft magnetic amorphous alloy ribbons on which a resin layer of a respective polyester resin was formed (magnetic pieces) and one soft magnetic amorphous alloy ribbon on which a resin layer was not formed were stacked up. The resultant structure was held at 150° C. for 5 minutes with a pressure of 0.25 MPa for thermocompression bonding, whereby the five soft magnetic amorphous alloy ribbons were stacked up and integrated into a multilayer magnetic piece. The respective multilayer magnetic pieces were Samples A1, B2, B3, G1, H1 and I1.

Figure 4:
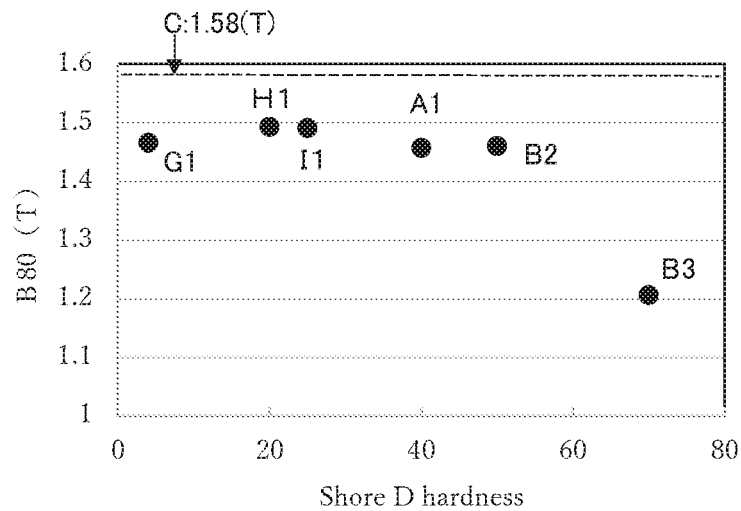
FIG. 4 is a graph showing the relationship between the value of the Shore D hardness and the magnetic flux density B80.

A magnetic field intensity of 80 A/m was applied to the prepared samples, and the magnetic flux density B80 was measured. Meanwhile, Sample C was prepared by stacking up five soft magnetic amorphous alloy ribbons by their own weight without forming a resin layer, and the magnetic flux density B80 was measured. In the measurement of B80, SK110 manufactured by Metron Technology Research was used. The measurement results are shown in TABLE 1. FIG. 4 shows the relationship between the Shore D hardness and B80.

TABLE 1

| Sample | Resin | Shore D Hardness | Thickness of Resin Layer (μm) | B80 (T) | Glass Transition Temperature of Resin (° C.) |
|---|---|---|---|---|---|
| G1 | g1 | 4 | 1.0 | 1.466 | −18 |
| H1 | h1 | 20 | 1.3 | 1.493 | 4 |
| I1 | i1 | 25 | 1.4 | 1.491 | 7 |
| A1 | a1 | 40 | 1.3 | 1.457 | 8 |
| B2 | b2 | 50 | 1.3 | 1.456 | −25 |
| B3 | b3 | 70 | 1.3 | 1.206 | 69 |
| C | — | — | — | 1.580 | — |

As seen from TABLE 1 and FIG. 4, Sample H1 whose Shore D hardness value was 20 had a highest B80. While B80 of Sample C with no resin layer was 1.580, B80 of Samples G1, H1, I1, A1 and B2 in which the resins whose Shore D hardness was between 4 and 50 were used was not less than 90% of B80 of Sample C (not less than 1.422 T). B80 of Samples H1, I1 in which the resins whose Shore D hardness was 20 and 25 were used was not less than 93% of B80 of Sample C (not less than 1.469 T).

When the glass transition temperature of the resin used was equal to or lower than 30° C., a resultant multilayer magnetic piece had a high B80.

Example 2

An adhesive agent which contains a polyester resin (Resin h1) whose Shore D hardness was 20 (glass transition temperature: 4° C.) was applied onto a soft magnetic amorphous alloy ribbon, whereby magnetic pieces with resin layers of varying thicknesses were produced. The resultant magnetic pieces were stacked up to produce a multilayer magnetic piece, and the magnetic flux density B80 was measured. The thicknesses of the resin layers of the magnetic pieces used in respective samples are shown in TABLE 2. The other conditions in production and measurement of the samples were the same as those of Example 1. The adhesiveness was evaluated by touching with a finger.

Figure 5:
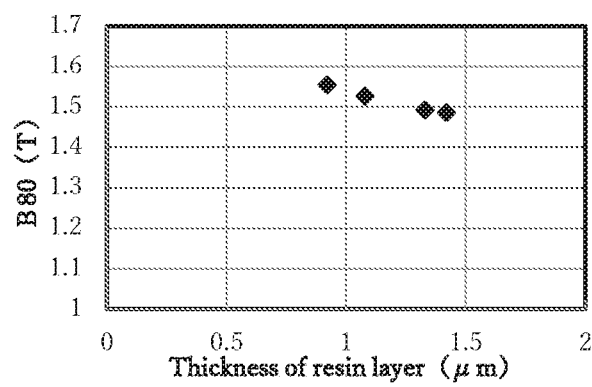
FIG. 5 is a graph showing the relationship between the thickness of a resin layer and the magnetic flux density B80.
Figure 6:
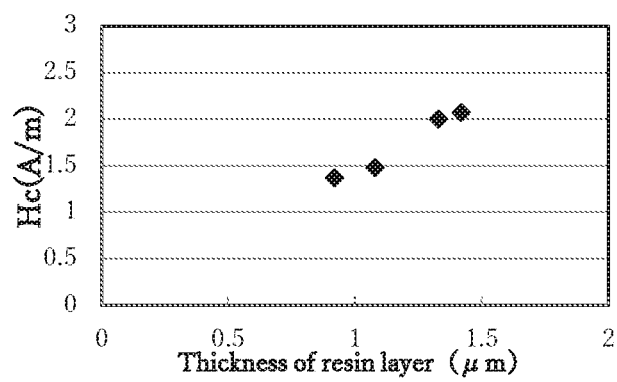
FIG. 6 is a graph showing the relationship between the thickness of the resin layer and the coercivity Hc.

The thickness of the resin layer and the value of B80 in the produced samples are shown in TABLE 2. The results of the evaluation of the adhesiveness in formation of the multilayer magnetic piece are also shown in TABLE 2. FIG. 5 shows the relationship between the thickness of the resin layer and B80. FIG. 6 shows the relationship between the thickness of the resin layer and Hc.

TABLE 2

| Sample | Thickness of Resin Layer (μm) | Adhesiveness | B80 (T) | Hc (A/m) |
|---|---|---|---|---|
| D1 | 0.92 | Almost good | 1.555 | 1.37 |
| D2 | 1.08 | Good | 1.527 | 1.48 |
| D3 | 1.33 | Good | 1.493 | 2.00 |
| D4 | 1.42 | Good | 1.486 | 2.07 |

As seen from TABLE 2 and FIG. 5, B80 decreases as the thickness of the resin layer increases. This is because, in our estimation, as the resin layer increased, the stress on the soft magnetic amorphous alloy ribbon increased, and accordingly, the magnetic domain structure changed, so that the magnetic anisotropy occurred and the magnetic flux density decreased. If it is not more than 1.3 μm, B80 of the multilayer core is not less than 1.50, and the resultant magnetic flux density B80 is not less than 93% (94.9%) of that of a multilayer magnetic piece which does not include a resin layer. Although not shown in TABLE 2 or FIG. 5, if the thickness of the resin layer was more than 1.45 μm, B80 of the multilayer core was less than 1.40 T (88.6%) in some cases.

On the other hand, as previously described, as the thickness of the resin layer decreases, the magnetic flux density B80 increases. Therefore, it is preferred that the resin layer has a smaller thickness. As seen from TABLE 2 and FIG. 6, as the thickness of the resin layer decreases, the coercivity Hc decreases, and this can contribute to reduction of the core loss. However, if the thickness of the resin layer is excessively small, there is a probability that sufficient adhesiveness will not be achieved. As seen from TABLE 2, if the thickness was 1.08 μm, excellent adhesiveness was achieved. When the thickness was 0.92 μm, the adhesiveness slightly decreased.

Example 3

The effect of improving the tackiness (stickiness) by adding a polystyrene resin to the resin layer was confirmed. An adhesive agent was prepared by adding a polystyrene resin to a polyester resin (Resin h1) whose Shore D hardness was 20 (glass transition temperature: 4° C.) such that the amount of the polystyrene resin contained was as shown in TABLE 3. In this example, a polyester solution in which the concentration of the polyester resin in the solvent (ethyl acetate) was 30 mass % and a polystyrene solution in which the concentration of the polystyrene resin in the solvent (methyl ethyl ketone) was 53 mass % were mixed together such that the amount of the contained polystyrene resin was as shown in TABLE 3. Specifically, where the mass of the polyester solution was A and the mass of the polystyrene solution was B, B×0.53/(A×0.30+B×0.53), Sample E1 was 0 mass %, Sample E2 was 2.6 mass %, Sample E3 was 5.0 mass %, Sample E4 was 7.4 mass %, Sample E5 was 9.6 mass %, Sample E6 was 17.5 mass %, and Sample E7 was 30.0 mass %.

In this example, three sheets of a soft magnetic amorphous alloy ribbon which have the same size as that of Example 1 were provided, and an adhesive agent was applied onto the surfaces of two sheets so as to have a thickness of 4 μm. Thereafter, the sheets were dried at 100° C. for 2-4 minutes, and a resin layer was formed, and one of the two sheets of the soft magnetic amorphous alloy ribbon was placed on the other. Further, another sheet of the soft magnetic amorphous alloy ribbon onto which the adhesive agent was not applied was placed on the resin layer, resulting in Samples E1 to E7.

Evaluation of the tackiness was carried out by storing the samples with a load of 2.5 kg on a circular region of 1 cm in radius at room temperature (25° C.) and 60° C. for 24 hours and, thereafter, removing the load and peeling off the uppermost soft magnetic amorphous alloy ribbon.

The results are shown in TABLE 3. In TABLE 3, "excellent" means that the soft magnetic amorphous alloy ribbon was successfully peeled off without resistance, "acceptable" means that the soft magnetic amorphous alloy ribbon was successfully peeled off although with some resistance, and "not acceptable" means that it was difficult to peel off the soft magnetic amorphous alloy ribbon.

TABLE 3

| Sample | Amount of polystyrene resin contained (mass %) | Magnetic characteristics | | | Tackiness | |
|---|---|---|---|---|---|---|
| | | B80 (T) | Br (T) | Hc (A/m) | Room temperature | 60° C. |
| E1 | 0.0 | 1.544 | 0.471 | 2.06 | Acceptable | Not acceptable |
| E2 | 2.6 | 1.511 | 0.426 | 1.88 | Acceptable | Acceptable |
| E3 | 5.0 | 1.546 | 0.417 | 1.89 | Excellent | Acceptable |
| E4 | 7.4 | 1.524 | 0.431 | 1.94 | Excellent | Excellent |
| E5 | 9.6 | 1.522 | 0.403 | 1.81 | Excellent | Excellent |
| E6 | 17.5 | 1.503 | 0.407 | 1.87 | Excellent | Excellent |
| E7 | 30.0 | 1.480 | 0.432 | 1.88 | Excellent | Excellent |

As the magnetic properties of Samples E1 to E7, B80, the residual magnetic flux density Br and the coercivity Hc were measured. The results are shown in TABLE 3. The relationships between the amount of contained polystyrene and these magnetic properties are shown in FIG. 7.

As seen from TABLE 3, in Sample E1 that did not contain a polystyrene resin, at room temperature, the soft magnetic amorphous alloy ribbon was successfully peeled off although with some resistance. However, at 60° C., it was difficult to peel off the soft magnetic amorphous alloy ribbon. In Sample E2 in which the amount of the polystyrene resin contained was 2.6 mass %, at both room temperature and 60° C., the soft magnetic amorphous alloy ribbon was successfully peeled off although with some resistance. In Sample E3 in which the amount of the polystyrene resin contained was 5.0 mass %, the soft magnetic amorphous alloy ribbon was successfully peeled off although with some resistance, and at room temperature, the soft magnetic amorphous alloy ribbon was successfully peeled off without resistance while the stickiness was suppressed (tack-free). In Samples E4, E5, E6 and E7 in which the amount of the polystyrene resin contained was 7.4 mass %, 9.6 mass %, 17.5 mass % and 30.0 mass %, respectively, at both room temperature and 60° C., the soft magnetic amorphous alloy ribbon was successfully peeled off without resistance while the stickiness was suppressed (tack-free), and Samples E4, E5, E6 and E7 were excellent in handling in work efficiency when they are in the form of magnetic pieces.

Figure 7:
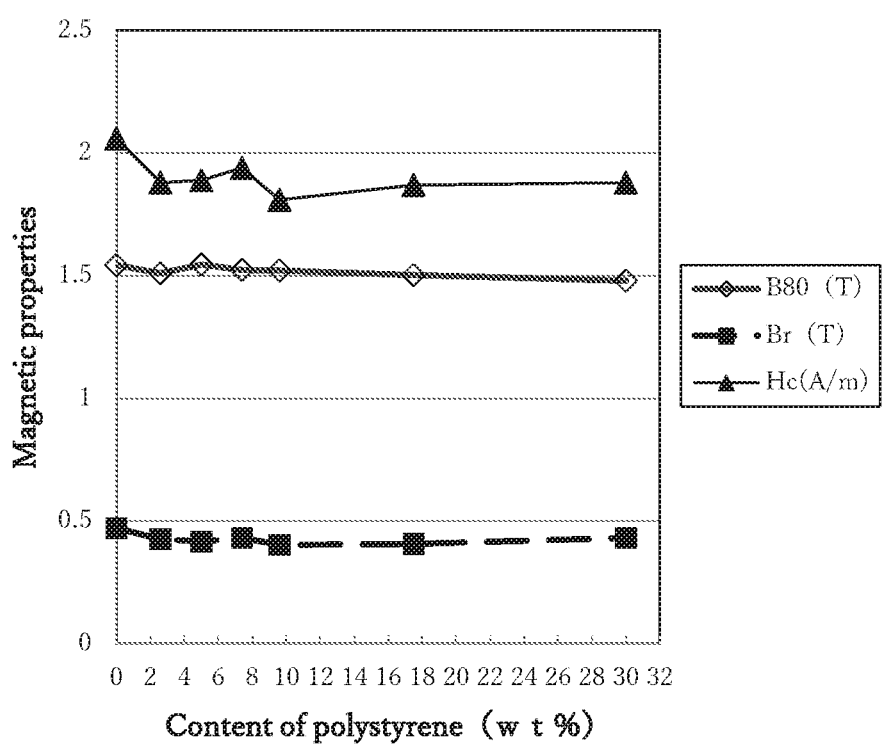
FIG. 7 is a graph showing the relationship between the amount of a polystyrene resin added and the magnetic properties (B80, Br, Hc).

On the other hand, as seen from FIG. 7, as the amount of the polystyrene resin contained increases, the magnetic properties are more likely to deteriorate. Particularly, B80 is more likely to deteriorate. Further, as the amount of the polystyrene resin increases, the adhesiveness of the resin layer in thermocompression bonding decreases, so that sufficient adhesion strength cannot be achieved in some cases.

Example 4

Multilayer magnetic pieces were produced, and the DC magnetic properties were measured. The results of the measurement are described. Sample F1 was produced using a polyester resin (Resin h1) whose Shore D hardness was 20 (glass transition temperature: 4° C.). Sample F1 was a multilayer magnetic piece which was the same as Example 1 except that the number of stacked magnetic pieces was 10. Sample F2 was produced using a polyethylene resin whose Shore D hardness was 43. Sample F2 was a multilayer magnetic piece which was the same as Example 1 except that the number of stacked magnetic pieces was 10. Sample F3 was produced by stacking up 10 sheets of a soft magnetic amorphous alloy ribbon without forming a resin layer.

Figure 8:
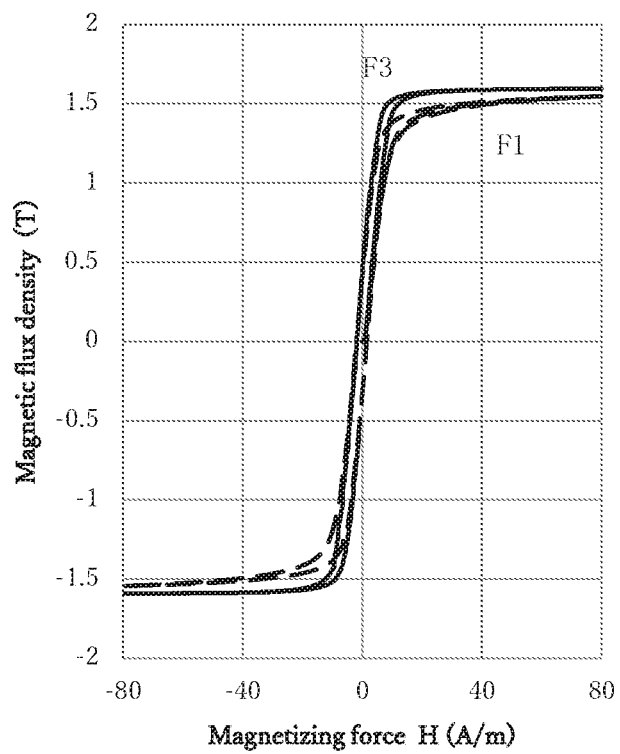
FIG. 8 is a graph showing the DC magnetic property of a magnetic piece which includes a resin layer whose major constituent is a polyester resin.
Figure 9:
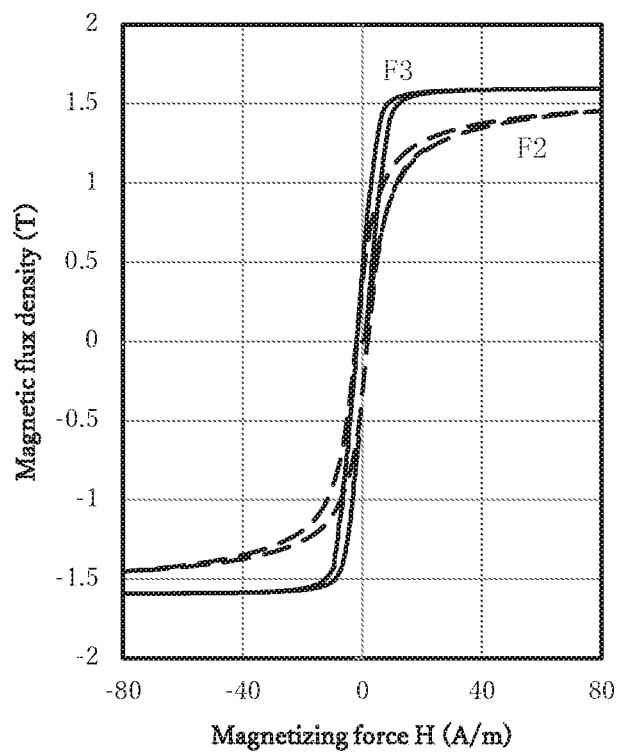
FIG. 9 is a graph showing the DC magnetic property of a magnetic piece which includes a resin layer whose major constituent is a polyethylene resin.

The DC magnetic properties of the respective samples were measured. In the measurement, SK110 manufactured by Metron Technology Research was used. The measurement results are shown in FIG. 8 and FIG. 9. Also, B80, Br and Hc of the respective samples were measured. Also, the squareness ratio Br/Bs, which is the ratio between the residual magnetic flux density Br and the saturation magnetic flux density Bs, was determined. The measurement results are shown in TABLE 4.

TABLE 4

| Sample | B80 (T) | Br (T) | Hc (A/m) | Squareness ratio (%) |
|---|---|---|---|---|
| F1 | 1.546 | 0.417 | 1.89 | 27.0 |
| F2 | 1.455 | 0.417 | 1.89 | 23.6 |
| F3 | 1.595 | 0.408 | 1.81 | 25.6 |

As seen from TABLE 4, FIG. 8 and FIG. 9, when the Shore D hardness of the resin layer was not more than 60, the magnetic density B80 was not less than 90% of that achieved without the resin layer (not less than 1.4355 T). It is also seen that Sample F1 which was a multilayer magnetic piece with the resin layer whose Shore D hardness was 20 had a magnetic property B80 of not less than 93% of that achieved without the resin layer. It is also seen that Sample F1 had an excellent squareness ratio exceeding 25%. That is, the multilayer magnetic piece of Sample F1 had a small core loss.

From the foregoing results, it is seen that according to the present disclosure, in producing a multilayer magnetic piece, a magnetic piece with a resin layer can be realized which is capable of achieving magnetic properties substantially equal to those achieved without the resin layer.

Example 5

Hereinafter, specific examples of the multilayer core are described in detail with reference to the drawings. Note that, however, the examples of the multilayer core are not limited to examples which will be described below.

The examples of the multilayer core described below are described with reference to FIG. 10 to FIG. 22. The multilayer core is described in detail with an example of a multilayer core of a rectangular ring structure produced by stacking up multilayer packets. The multilayer packet is a unit piece which includes two multilayer magnetic pieces formed by stacking up a plurality of magnetic pieces, two first electromagnetic steel plates provided on respective end surfaces of the two multilayer magnetic pieces facing away from each other, and a second electromagnetic steel plate provided between the two multilayer magnetic pieces.

Figure 10:
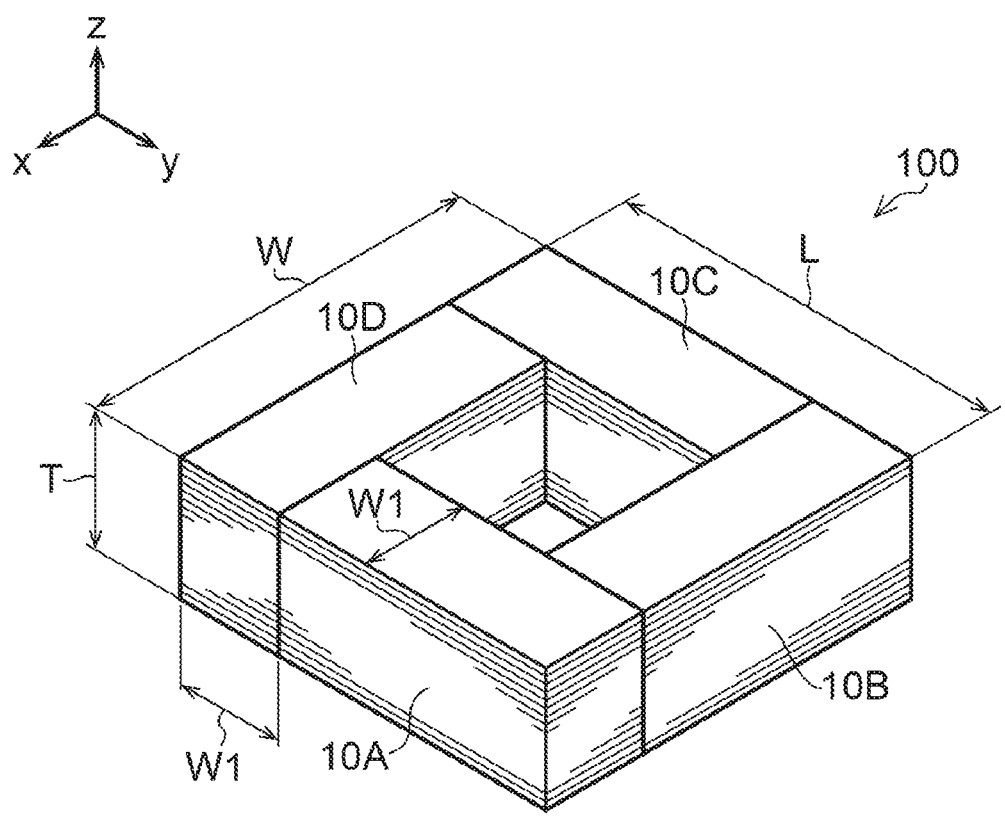
FIG. 10 is a perspective view showing an example of an embodiment of another multilayer core.

The multilayer core shown in FIG. 10 includes four core blocks (multilayer packets) 10A, 10B, 10C and 10D. The four core blocks are in a rectangular ring arrangement so as to form an angle of 90°. The four core blocks are joined at the end portions in the longitudinal direction. The four core blocks are joined into a rectangular ring structure such that, between two adjoining core blocks, the core blocks are joined so as to form an angle of 90°. The four core blocks are joined together in the form of a rectangular ring, whereby a closed magnetic path is formed. Each of the four core blocks is a multilayer structure formed by stacking up multilayer packets.

Figure 12:
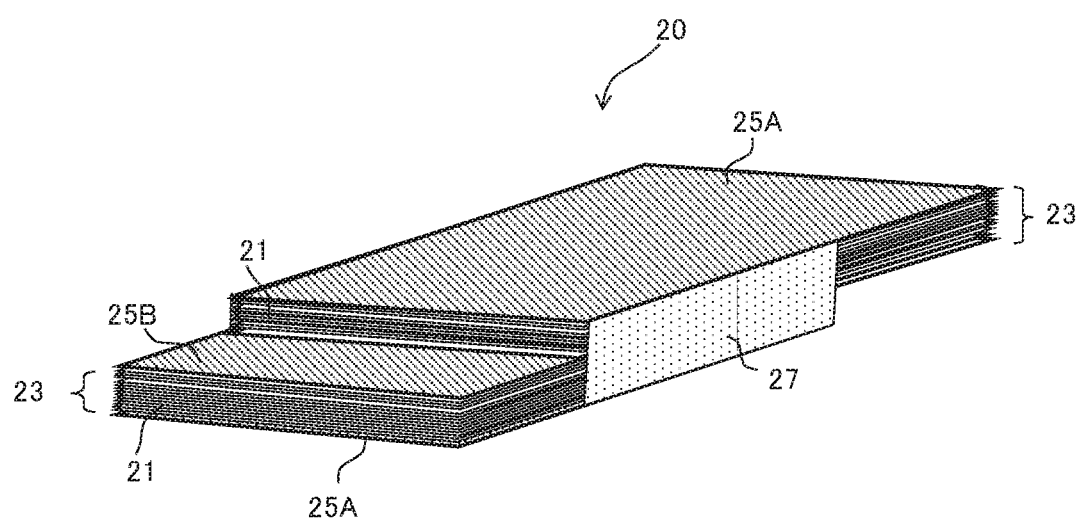
FIG. 12 is a perspective view showing an example of an embodiment of a multilayer packet.

An example of a multilayer packet in a multilayer core is shown in FIG. 12. The multilayer packet is formed by stacking up two multilayer magnetic pieces 23 produced by stacking up a plurality of magnetic pieces, two electromagnetic steel plates 25A provided on end surfaces of the two multilayer magnetic pieces facing away from each other (first electromagnetic steel plates), and a single electromagnetic steel plate 25B provided between the two multilayer magnetic pieces (second electromagnetic steel plate).

FIG. 10 is a perspective view conceptually showing a multilayer core 100. In FIG. 10, the arrangement plane of four core blocks 10A, 10B, 10C and 10D in a rectangular ring arrangement is identical with the xy plane (plane including x axis and y axis), and the normal direction of the xy plane is identical with the z axis direction.

The four core blocks 10A, 10B, 10C and 10D have, in appearance, a shape of equal length L-w1, equal width w1, and equal height T (rectangular parallelepiped). The multilayer core 100 is a square rectangular ring of length L. The respective core blocks overlap at the end portions as will be described later.

The magnetic path of the multilayer core 100 is formed using a plurality of identical multilayer packets. The plurality of multilayer packets are arranged in the form of a square ring, and opposite end portions in the longitudinal direction of the respective multilayer packets are joined together. That is, the multilayer core 100 is formed by stacking up in the z direction square rings each of which is formed by joining together four multilayer packets. Although the multilayer core 100 is an example of the square form, it is not limited to square but may be a different quadrilateral such as a rectangle.

Figure 11A:
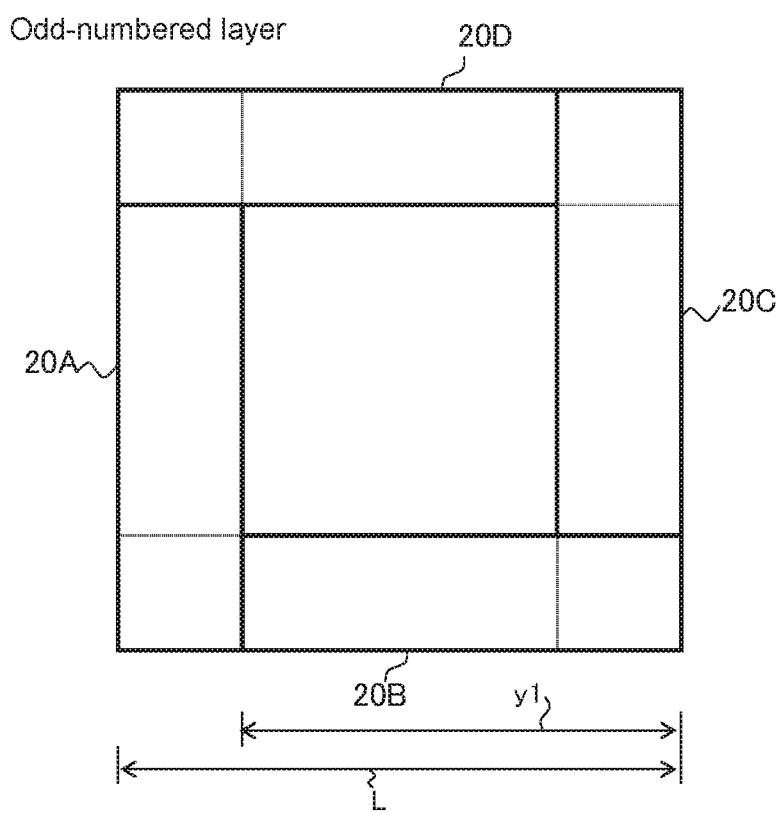
FIG. 11A is a plan view showing a rectangular ring structure of an odd-numbered layer which is a constituent of a multilayer core.
Figure 11B:
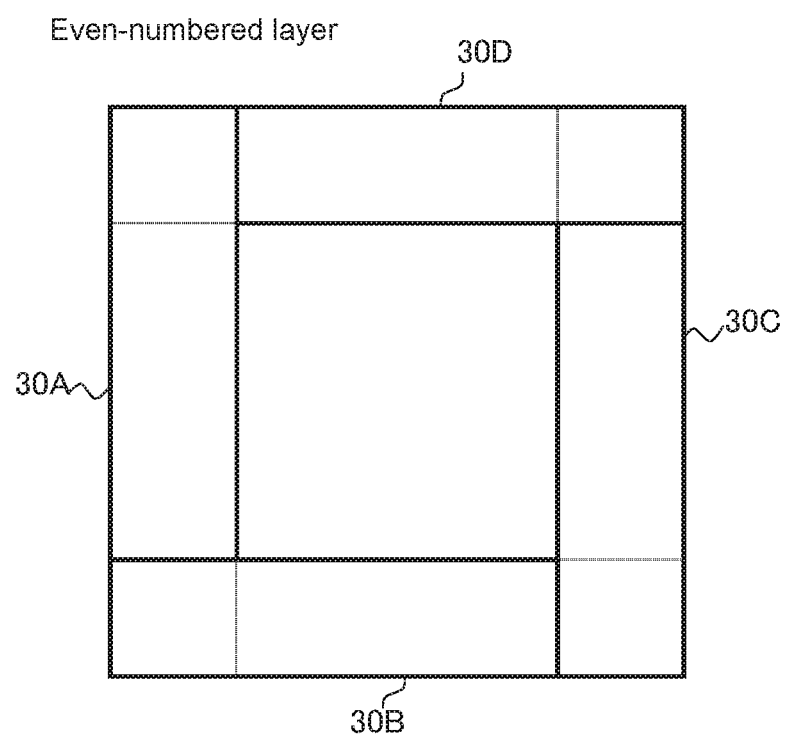
FIG. 11B is a plan view showing a rectangular ring structure of an even-numbered layer which is a constituent of a multilayer core.

When a multilayer core is formed using multilayer packets as in the multilayer core 100, it is not necessary to use different ways of stacking between the odd-numbered layers and the even-numbered layers of the ring structure. However, in some cases, as shown in FIG. 11A and FIG. 11B, it is possible to use different ways of stacking between the odd-numbered layers (the first layer, the third layer, . . . ) and the even-numbered layers (the second layer, the fourth layer, . . . ). Specifically, the ring structure that forms the multilayer core 100 may be formed by alternately stacking up the odd-numbered layers and the even-numbered layers as shown in FIG. 22.

The odd-numbered layers have a rectangular ring structure as shown in FIG. 11A in which one end of the multilayer packet 20D is superposed on one end of the multilayer packet 20A, one end of the multilayer packet 20C is superposed on the other end of the multilayer packet 20D, one end of the multilayer packet 20B is superposed on the other end of the multilayer packet 20C, and the other end of the multilayer packet 20A is superposed on the other end of the multilayer packet 20B.

The even-numbered layers have a rectangular ring structure as shown in FIG. 11B in which the direction of superposition is opposite to that of the odd-numbered layers. Specifically, the even-numbered layers have such a rectangular ring structure that one end of the multilayer packet 30B is superposed on one end of the multilayer packet 30A, one end of the multilayer packet 30C is superposed on the other end of the multilayer packet 30B, one end of the multilayer packet 30D is superposed on the other end of the multilayer packet 30C, and the other end of the multilayer packet 30A is superposed on the other end of the multilayer packet 30D.

Figure 22:
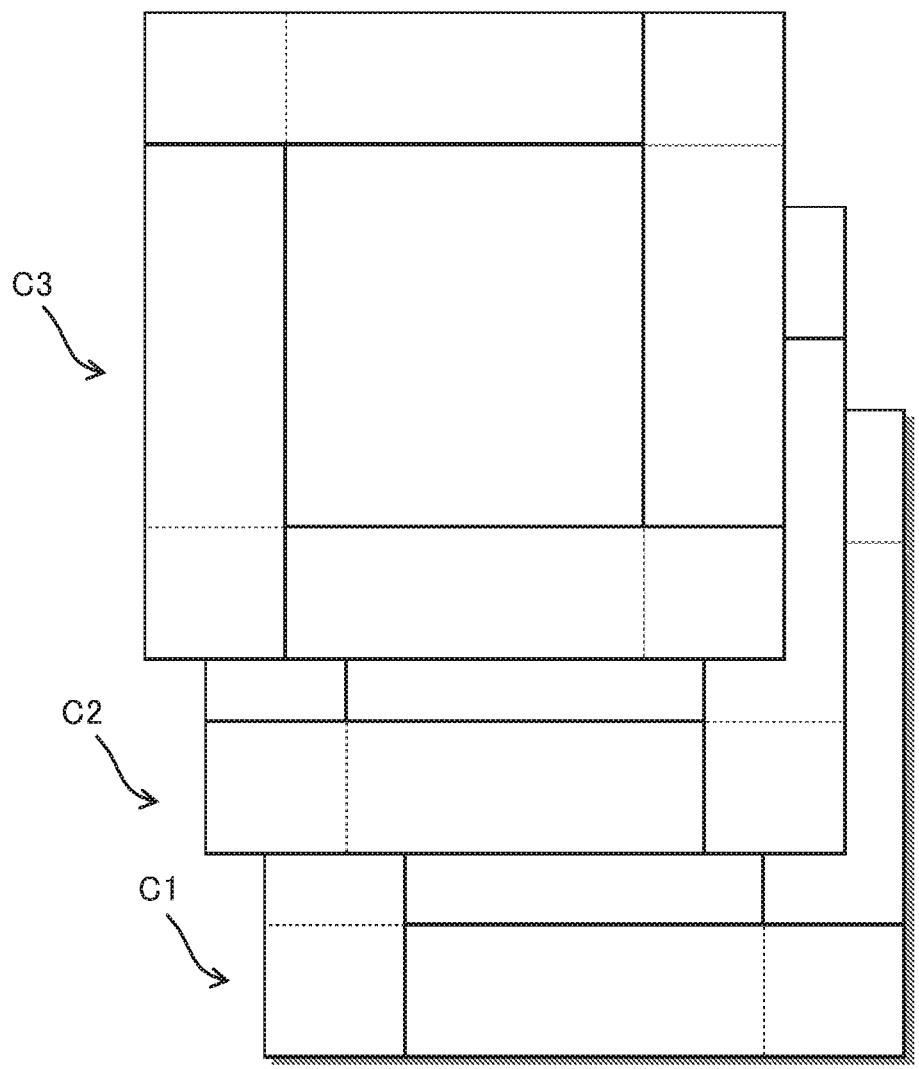
FIG. 22 is a general illustrative diagram for illustrating a multilayer core realized by alternatively stacking up two types of rectangular rings which are produced by joining together four multilayer packets.

As shown in FIG. 22, the multilayer core 100 is produced by alternately stacking up the above-described odd-numbered layers and even-numbered layers in a desired number of layers (number of multilayer packets) (for example, as shown in FIG. 22, sequentially stacking up the first layer (odd-numbered layer) C1, the second layer (even-numbered layer) C2, the third layer (odd-numbered layer) C3, . . . ). In the multilayer core 100, in each of four sides of the rectangular ring, 11 multilayer packets are stacked up.

The core blocks 10A, 10B, 10C and 10D that are constituents of the multilayer core 100 are each formed by stacking up multilayer packets 20 which have the configuration shown in FIG. 12. Thus, handling of an extremely thin magnetic piece is easy, and a multilayer core of excellent stacking accuracy can be produced.

The multilayer packet 20 includes, as shown in FIG. 12, two multilayer magnetic pieces 23 which include a multilayer magnetic piece formed by stacking up a plurality of magnetic pieces 21, two electromagnetic steel plates (first electromagnetic steel plates) 25A provided on respective end surfaces of the two multilayer magnetic pieces 23 facing away from each other, and an electromagnetic steel plate (second electromagnetic steel plate) 25B provided between the two multilayer magnetic pieces 23. The multilayer magnetic pieces 23 have the shape of a rectangular parallelepiped and are arranged with a displacement such that the end surfaces of the end portions in the longitudinal direction of one of the multilayer magnetic pieces 23 are not coplanar with the end surfaces of the end portions in the longitudinal direction of the other multilayer magnetic piece 23. The multilayer magnetic pieces 23 and the electromagnetic steel plates 25A, 25B are fixed by the layered-surface resin layer 27.

The multilayer magnetic pieces 23 are produced by stacking up a plurality of magnetic pieces. The two multilayer magnetic pieces have an equal number of layers of magnetic pieces. In a multilayer core, a single multilayer magnetic piece is formed by stacking up 30 magnetic pieces. Therefore, in this multilayer packet 20, the number of layers of magnetic pieces is 60. The size of the magnetic pieces is 426 mm in length×142 mm in width. The displacement width (displaced length) of the end portions is equal to the width of the magnetic pieces, i.e., 142 mm.

The dimension in the width direction (transverse direction) of the electromagnetic steel plates 25A are equal to that of the multilayer magnetic pieces 23 of the magnetic pieces. That is, the multilayer magnetic pieces 23 are arranged so as to extend across the entire width in the transverse direction of the electromagnetic steel plates. The length in the longitudinal direction of the electromagnetic steel plates 25A is equal to the total length of the two multilayer magnetic pieces 23 on the upper and lower sides, i.e., 568 mm.

The electromagnetic steel plate 25B is provided between two multilayer magnetic pieces 23 and is in contact with the entire surface of one of the two multilayer magnetic pieces 23 and in contact with part of the surface of the other multilayer magnetic piece 23. Therefore, the electromagnetic steel plate 25B is provided between two multilayer magnetic pieces 23, and covers the entirety of the surface in the stacking direction of one of the multilayer magnetic pieces and is partially exposed.

A resin layer, which is formed by applying a resin whose Shore D hardness is not more than 60, is provided between multilayer magnetic pieces which are adjacent to the electromagnetic steel plates 25A and between multilayer magnetic pieces which are adjacent to the electromagnetic steel plate 25B. By thermocompression bonding, the magnetic pieces and the electromagnetic steel plates, and the multilayer magnetic piece and the electromagnetic steel plates, are mechanically secured by the resin layer.

The surface roughness (arithmetic mean roughness Ra measured in compliance with JIS B0601-2001) of the major surfaces of the electromagnetic steel plates is preferably in the range of 0.10 μm to 0.20 μm, more preferably in the range of 0.1 μm to 0.15 μm.

If the surface roughness Ra of the electromagnetic steel plates is not more than 0.20 μm, electromagnetic steel plates which are in contact with each other have excellent slipperiness. This is advantageous from the viewpoint of improving the manufacturing efficiency.

Now, the multilayer packet 20 is further described with reference to FIG. 13.

Figure 13:
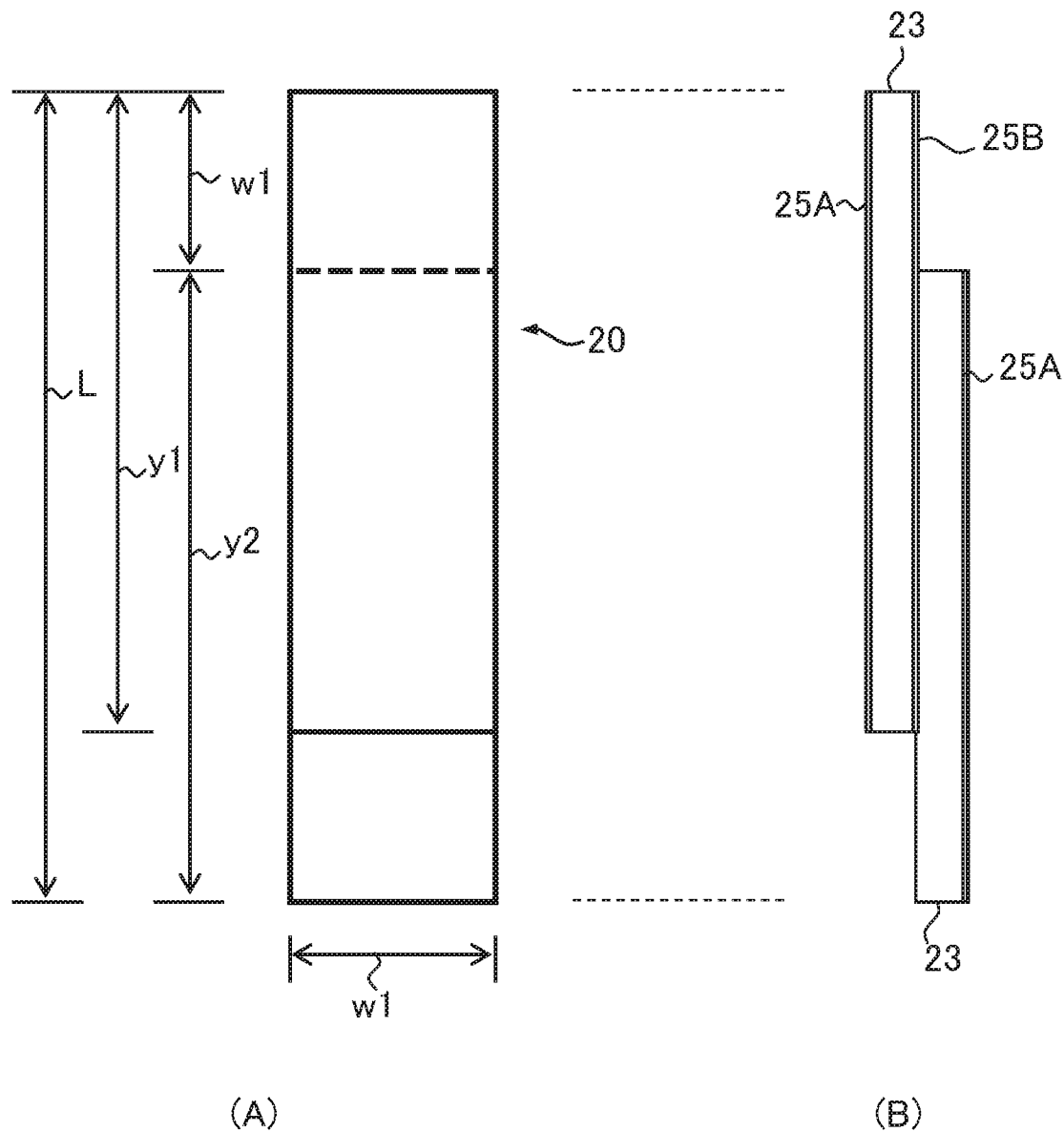
FIG. 13A is a general plan view of FIG. 12.
FIG. 13B is a general side view of FIG. 12.

FIG. 13(A) is a plan view of the multilayer packet 20 shown in FIG. 12 which is placed on a horizontal table surface where the electromagnetic steel plates 25A is viewed in plan from above. FIG. 13(B) is a side view of the multilayer packet 20 shown in FIG. 12, which is viewed from a lateral side. In FIG. 13, the layered-surface resin layer 27 of FIG. 12 is not shown.

This multilayer packet 20 is formed by two multilayer magnetic pieces 23 which are arranged with a displacement as shown in FIG. 13(A) such that the end surfaces of the end portions in the longitudinal direction (the end portions in the direction of length y1 or y2(L−w1)) of one of the multilayer magnetic pieces 23 are not coplanar with the end surfaces of the end portions in the longitudinal direction of the other multilayer magnetic piece 23, and forms one side of the rectangular ring of length L shown in FIG. 10. The length of the displacement (displacement width) is equal to the width w1 of the multilayer magnetic piece.

As shown in FIG. 13(B) that is a side view of the multilayer packet 20, the multilayer packet 20 has a multilayer structure of an electromagnetic steel plate 25A/a multilayer magnetic piece 23/an electromagnetic steel plate 25B/a multilayer magnetic piece 23/an electromagnetic steel plate 25A. In the multilayer magnetic pieces 23, amorphous alloy ribbons are joined together by a resin layer which is formed by applying a resin whose Shore D hardness is not more than 60. Further, the multilayer magnetic pieces 23 and the electromagnetic steel plates 25A are also joined together by the same resin layers, and the multilayer magnetic pieces 23 and the electromagnetic steel plate 25B are also joined together by the same resin layers. Further, respective ones of these are secured by the layered-surface resin layer 27.

Figure 14:
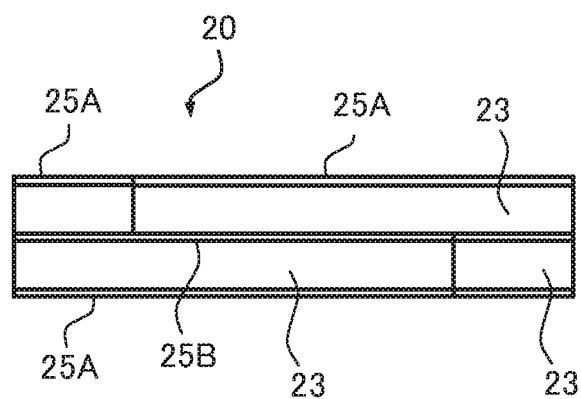
FIG. 14 is a general side view showing a form where a plurality of pieces of the multilayer packet of FIG. 12 are combined together.

In the multilayer core 100, as shown in FIG. 14, in the multilayer portion of an electromagnetic steel plate 25A/a multilayer magnetic piece 23/an electromagnetic steel plate 25B/a multilayer magnetic piece 23/an electromagnetic steel plate 25A, part of the electromagnetic steel plate 25B is shared by the two multilayer magnetic pieces 23.

In one of the two multilayer magnetic pieces 23, as shown in FIG. 13(B), the electromagnetic steel plate 25B is provided on a side opposite to the electromagnetic steel plate 25A. The two multilayer magnetic pieces 23 are arranged with a displacement in the plane direction and the longitudinal direction of the electromagnetic steel plate 25B. Accordingly, in one of the multilayer magnetic pieces 23, the surface of the electromagnetic steel plate 25B is partially exposed, while in the other multilayer magnetic pieces 23, a surface on a side opposite to the electromagnetic steel plate 25A is exposed. When the multilayer packet 20 shown in FIG. 12 is used, they can be connected together without forming a step by assembling a plurality of multilayer packets 20 as shown in FIG. 14.

Figure 15:
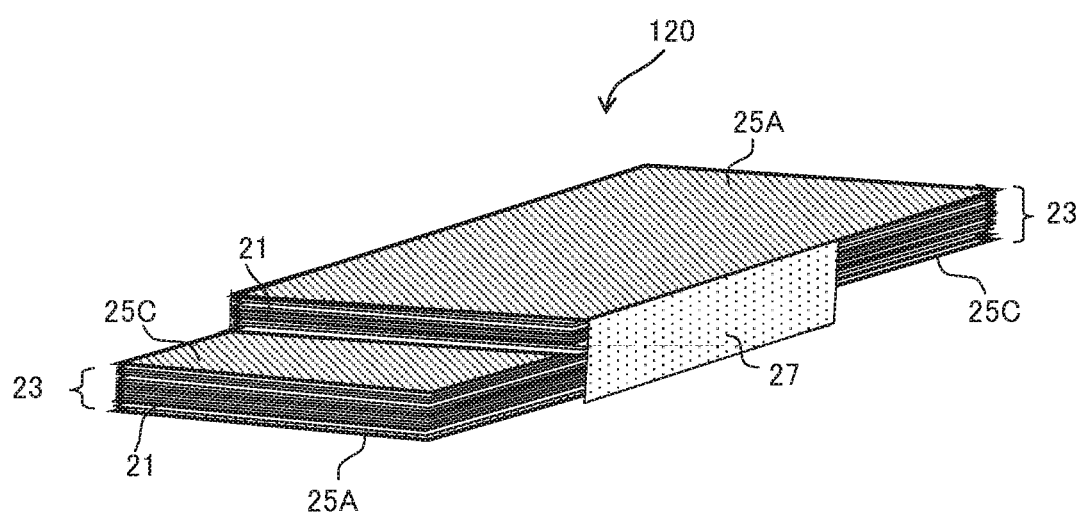
FIG. 15 is a perspective view showing another example of an embodiment of the multilayer packet.
Figure 16:
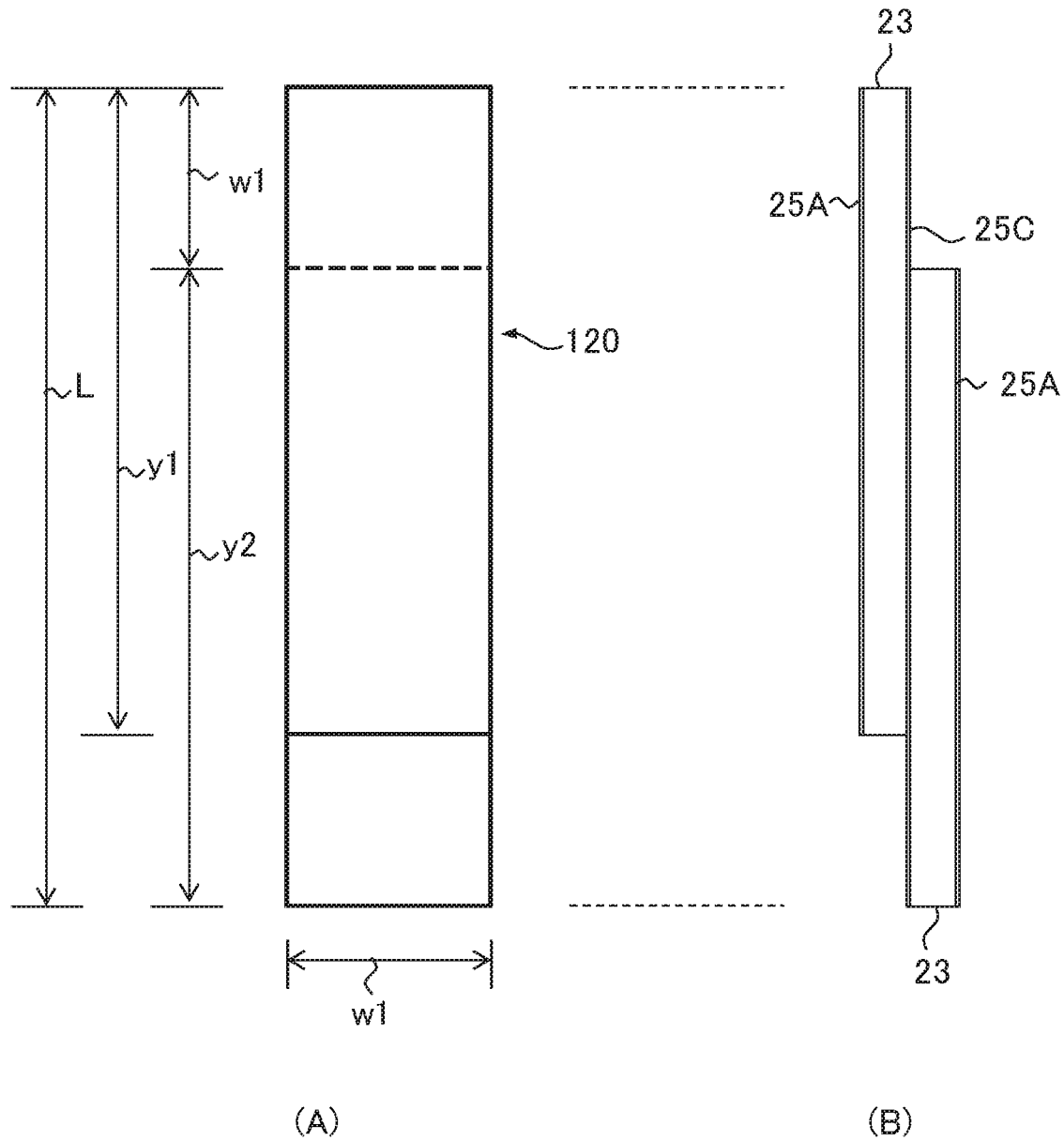
FIG. 16(A) is a general plan view of FIG. 15.
FIG. 16(B) is a general side view of FIG. 15.
Figure 17:
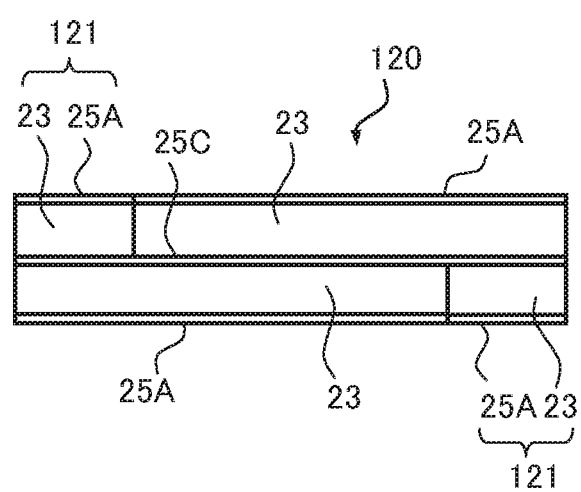
FIG. 17 is a general side view showing a form where the multilayer packet of FIG. 15 combined with another multilayer packet.

Alternatively, the multilayer packet may be configured as shown in FIG. 15 to FIG. 17 such that, between the two multilayer magnetic pieces 23, a single electromagnetic steel plate 25C which has a greater length than the multilayer magnetic pieces 23 is provided over the entirety of surfaces of the multilayer magnetic pieces 23 facing each other.

Specifically, as shown in FIG. 15, the multilayer packet may be a multilayer packet 120 which has a multilayer portion of an electromagnetic steel plate 25A/a multilayer magnetic piece 23/an electromagnetic steel plate 25C/a multilayer magnetic piece 23/an electromagnetic steel plate 25A. In the multilayer magnetic pieces 23, amorphous alloy ribbons are joined together by a resin layer which is formed by applying a resin whose Shore D hardness is not more than 60. Further, the multilayer magnetic pieces 23 and the electromagnetic steel plates 25A are also joined together by the same resin layers, and the multilayer magnetic pieces 23 and the electromagnetic steel plate 25C are also joined together by the same resin layers. Further, respective ones of these are secured by the layered-surface resin layer 27.

In this case, as shown in FIG. 16, the electromagnetic steel plate 25C has a length equal to total length defined by two multilayer magnetic pieces which are arranged with a displacement such that the end surfaces of the end portions in the longitudinal direction of one of the multilayer magnetic pieces are not coplanar with the end surfaces of the end portions in the longitudinal direction of the other multilayer magnetic piece (distance L in FIG. 16), i.e., the overall length in the longitudinal direction of the multilayer packet 120, and a width length. In a multilayer portion of an electromagnetic steel plate 25A/a multilayer magnetic piece 23/an electromagnetic steel plate 25C/a multilayer magnetic piece 23/an electromagnetic steel plate 25A, the electromagnetic steel plate 25C is shared by the two multilayer magnetic pieces 23. In the other portion than the multilayer portion (a portion not overlapped by the two multilayer magnetic pieces 23), the electromagnetic steel plate 25C is arranged so as to cover part of the surfaces of one multilayer magnetic piece and the other multilayer magnetic piece, and the electromagnetic steel plate 25C is exposed.

When the multilayer packet 120 shown in FIG. 15 is used, by providing different multilayer packets 121, a configuration where a plurality of multilayer packets are connected together can be realized as shown in FIG. 17.

As another variation of the multilayer packet, two electromagnetic steel plates may be provided between two multilayer magnetic pieces 23 as shown in FIG. 18 to FIG. 19. Specifically, as shown in FIG. 18, it may be a multilayer packet 220 realized by stacking up two multilayer magnetic pieces 23 which are formed by stacking up a plurality of magnetic pieces, two electromagnetic steel plates 25A which are provided on surfaces of the two multilayer magnetic pieces facing away from each other, and two electromagnetic steel plates 25B which are provided on the other surfaces of the two multilayer magnetic pieces facing each other. In this case, the multilayer magnetic pieces 23, each of which is interposed between two electromagnetic steel plates, are arranged with a displacement in the plane direction and the longitudinal direction of the electromagnetic steel plates 25B, so that part of the surfaces of the electromagnetic steel plates 25B in portions not overlapped by ribbon pieces of the multilayer packet is exposed.

The multilayer packet 220 is configured as shown in FIG. 18 such that the end surfaces of the end portions in the longitudinal direction (the end portions in the direction of length y1 or y2) of one of the two multilayer magnetic pieces 23 interposed between electromagnetic steel plates are not coplanar with the end surfaces of the end portions in the longitudinal direction of the other multilayer magnetic piece. As shown in FIG. 18(B) that is a side view of the multilayer packet, the multilayer packet 220 has a multilayer structure of an electromagnetic steel plate 25A/a multilayer magnetic piece 23/an electromagnetic steel plate 25B/an electromagnetic steel plate 25B/a multilayer magnetic piece 23/an electromagnetic steel plate 25A. The two electromagnetic steel plates 25B are shared while one is placed on the other. In the multilayer magnetic pieces 23, amorphous alloy ribbons are joined together by a resin layer which is formed by applying a resin whose Shore D hardness is not more than 60. Further, the multilayer magnetic pieces 23 and the electromagnetic steel plates 25A are also joined together by the same resin layers, and the multilayer magnetic pieces 23 and the electromagnetic steel plates 25B are also joined together by the same resin layers.

When the multilayer packet 220 shown in FIG. 18 is used, a configuration where a plurality of multilayer packets 220 are assembled and connected together can be realized as shown in FIG. 19. In this multilayer packet 220, the thickness does not partially vary. When this multilayer packet is stacked up, the electromagnetic steel plates 25B overlap in two layers, and therefore, the thickness of the electromagnetic steel plates 25B is preferably as small as possible.

Figure 20:
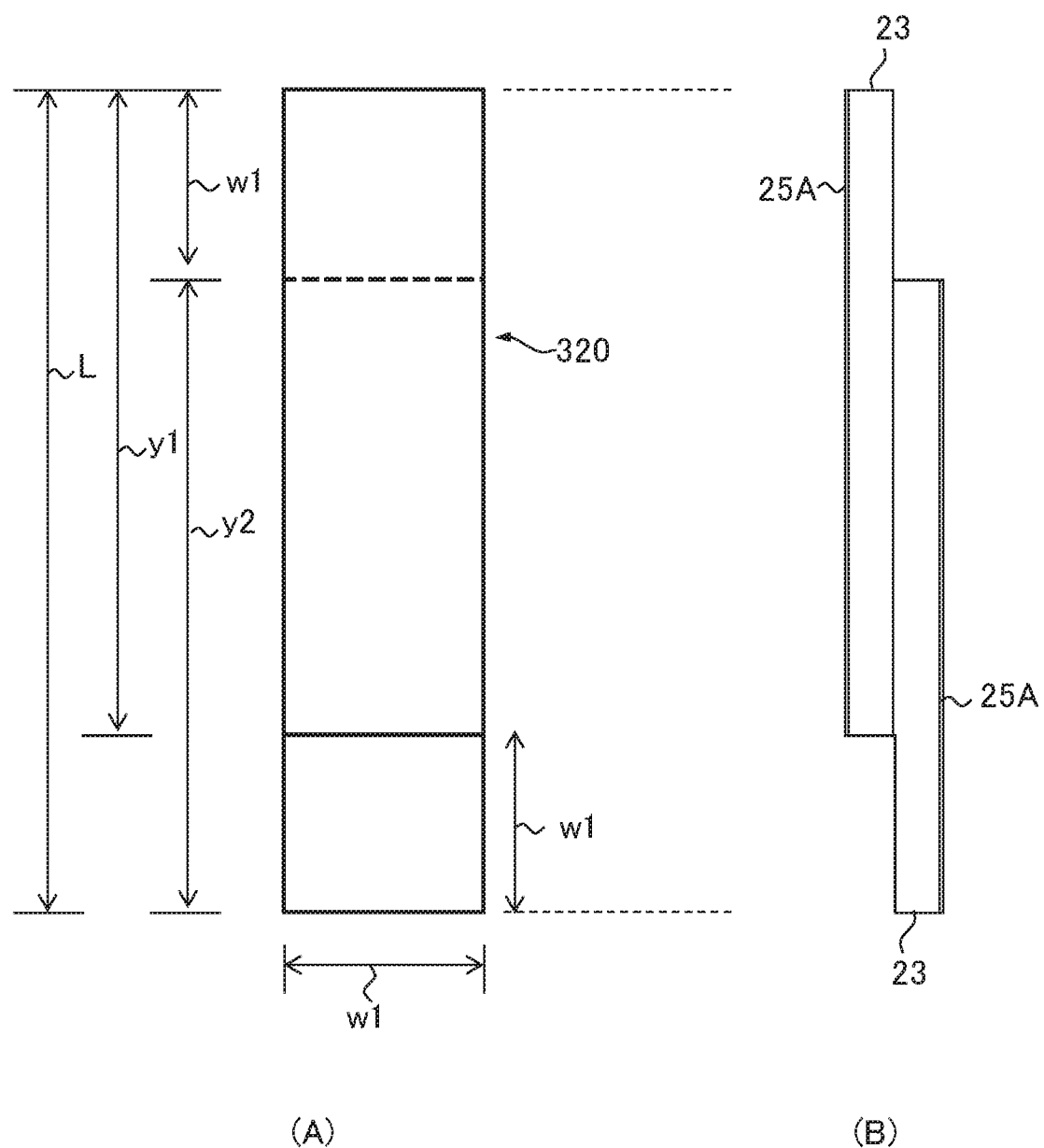
FIG. 20(A) is a general plan view of another example of an embodiment of the multilayer packet.
FIG. 20(B) is a general side view of FIG. 20(A).
Figure 21:
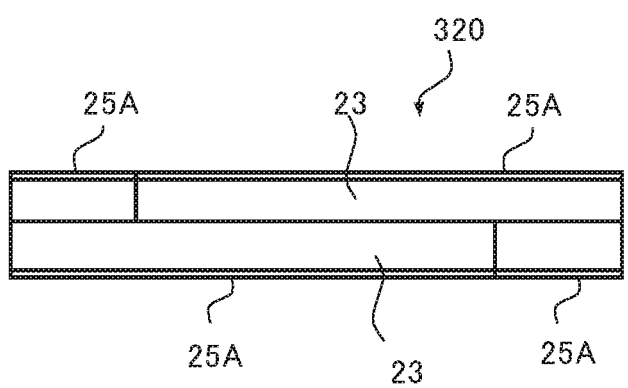
FIG. 21 is a general side view showing a form where a plurality of pieces of the multilayer packet of FIG. 20 are combined together.

As another variation of the multilayer packet, as shown in FIG. 20 to FIG. 21, electromagnetic steel plates 25A may be provided on respective end surfaces of two multilayer magnetic pieces 23 facing away from each other without providing an electromagnetic steel plate between the two multilayer magnetic pieces 23. This variation has a step-lap structure which will be described later in conjunction with a multilayer core and is advantageous in that the iron loss can be suppressed to a low level.

Specifically, as shown in FIG. 20, it may be a multilayer packet 320 produced by stacking up two multilayer magnetic pieces 23, which are produced by stacking up a plurality of magnetic pieces, and two electromagnetic steel plates 25A respectively provided on surfaces of the two multilayer magnetic pieces facing away from each other. In this case, the two multilayer magnetic pieces 23 with an electromagnetic steel plate on one surface are arranged with a displacement in the plane direction and the longitudinal direction such that the end surfaces of the end portions in the longitudinal direction (the end portions in the direction of length y1 or y2) of one of the two multilayer magnetic pieces 23 are not coplanar with the end surfaces of the end portions in the longitudinal direction of the other multilayer magnetic piece 23. Accordingly, in portions of the multilayer packet in which the multilayer magnetic pieces do not overlap, the surfaces of the multilayer magnetic pieces are partially exposed.

As shown in FIG. 20(B) that is a side view of the multilayer packet 320, the multilayer packet 320 has a multilayer structure of an electromagnetic steel plate 25A/a multilayer magnetic piece 23/a multilayer magnetic piece 23/an electromagnetic steel plate 25A. In the multilayer magnetic pieces 23, amorphous alloy ribbons are joined together by a resin layer which is formed by applying a resin whose Shore D hardness is not more than 60. Further, the multilayer magnetic pieces 23 and the electromagnetic steel plates 25A are also joined together by the same resin layers. When the multilayer packet 320 shown in FIG. 20 is used, a configuration where a plurality of multilayer packets 320 are assembled and connected together can be realized as shown in FIG. 21.

The layered-surface resin layer 27 is provided on, for example, a layered surface in a multilayer portion of an electromagnetic steel plate 25A/a multilayer magnetic piece 23/an electromagnetic steel plate 25B/a multilayer magnetic piece 23/an electromagnetic steel plate 25A (a surface formed by an aggregate of lateral surfaces corresponding to the thicknesses of ribbon pieces and electromagnetic steel plates). In the multilayer portion, the layered-surface resin layer 27 secures the electromagnetic steel plates and the multilayer magnetic pieces.

The layered-surface resin layer 27 is formed by using an epoxy-based resin. At the layered surface of the multilayer magnetic pieces and the electromagnetic steel plates, applying a curable resin (for example, epoxy-based resin) onto at least part extending over both elements and curing the applied resin, whereby a layered-surface resin layer is formed.

In the above-described embodiments, in the multilayer packets mainly described in FIG. 12 and FIG. 15, two multilayer magnetic pieces formed by stacking up a plurality of magnetic pieces are arranged such that one end of one of the multilayer magnetic pieces is displaced from one end of the other multilayer magnetic piece by a predetermined distance toward the other end in the longitudinal direction of the multilayer magnetic piece. However, the present invention is not limited to such embodiments.

Figure 26:
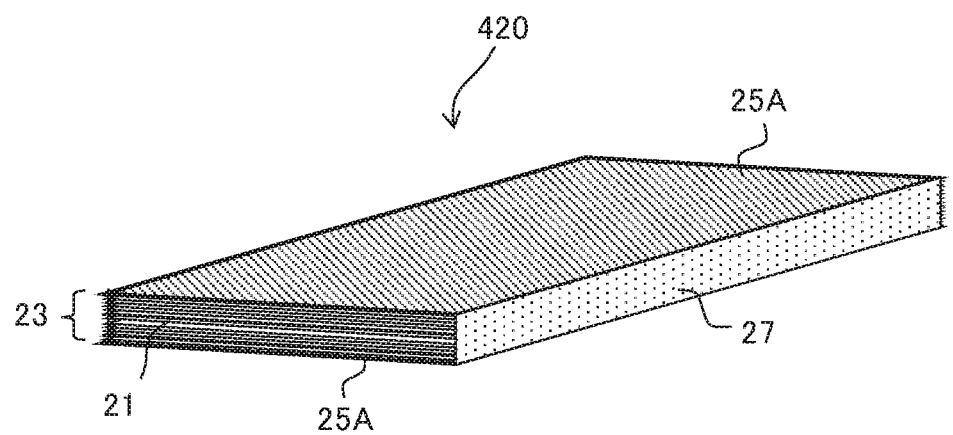
FIG. 26 is a perspective view showing another example of an embodiment of the multilayer packet.

As a specific example, a core block may use a multilayer packet 420 shown in FIG. 26, which includes a multilayer magnetic piece 23 produced by stacking up a plurality of magnetic pieces 21 and two electromagnetic steel plates 25A which sandwich the multilayer magnetic piece 23. At a lateral surface, a layered-surface resin layer 27 is provided.

Example 6

Figure 25:
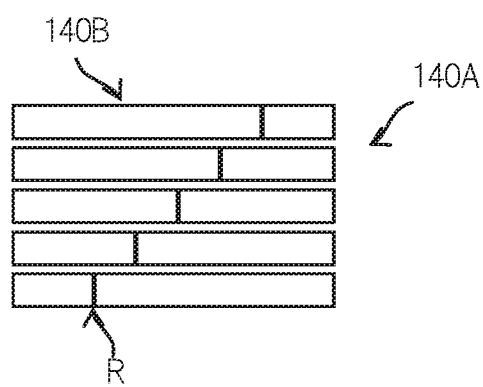
FIG. 25 is a general cross-sectional view for illustrating the step-lap structure of the joint portions.

An embodiment of another multilayer core of the present disclosure is described with reference to FIG. 23 to FIG. 25.

FIG. 24 shows a plan view of a multilayer core 300. This multilayer core 300 is a core of a closed magnetic path formed by four core blocks 140A, 140B, 140C, 140D which are joined together in the shape of a rectangular ring. Between adjoining two of the core blocks, the multilayer core 300 has a joint portion at which end portions in the longitudinal direction of respective multilayer packets are joined to each other. At this joint portion, the core blocks are joined to each other at slope surfaces in which the end portions of the multilayer magnetic pieces of the multilayer packets are inclined at inclination angle θ1 with respect to the longitudinal direction and which have steps formed by displacing the multilayer magnetic pieces in the longitudinal direction.

Components which are equivalent to those of the multilayer core 100 are designated by the same reference numerals, and the detailed description thereof is omitted.

Figure 23:
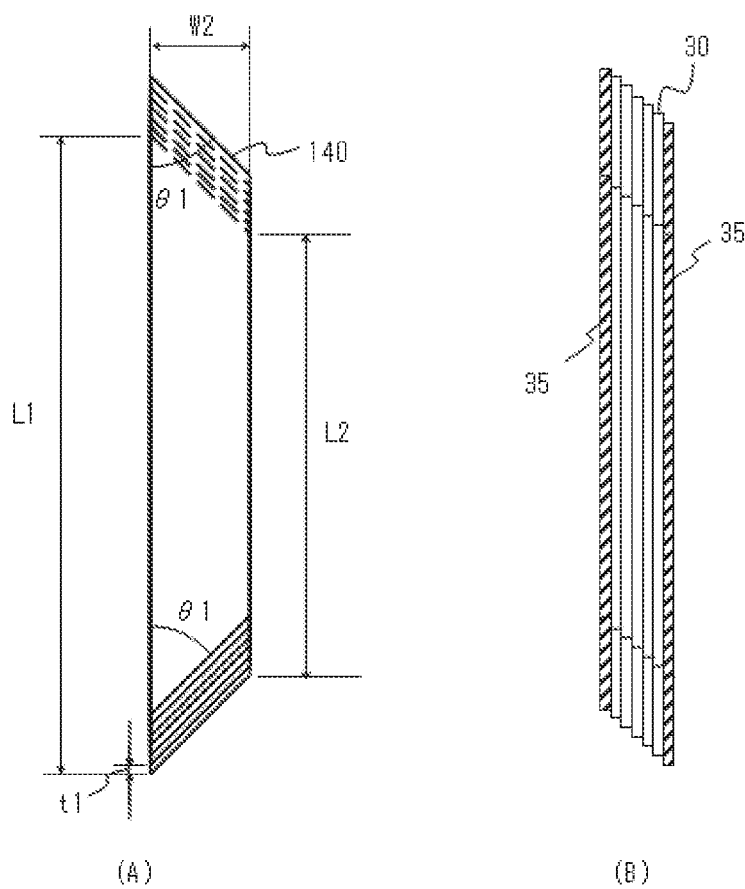
FIG. 23 shows an example of a multilayer packet which is preferred in the case where the joint portion has a step-lap structure.

The multilayer packet 140 includes, as shown in FIG. 23, five multilayer magnetic pieces 30 and a pair of electromagnetic steel plates 35 between which the five multilayer magnetic pieces 30 are interposed. In the multilayer magnetic pieces 30, soft magnetic amorphous alloy ribbons are joined together by resin layers which are formed by applying a resin whose Shore D hardness is not more than 60. Further, the multilayer magnetic pieces 30 are also joined together by the same resin layers, and the multilayer magnetic piece 30 and the electromagnetic steel plate 35A are also joined together by the same resin layer. Further, the five multilayer magnetic pieces 30 and the two electromagnetic steel plates 35 are fixed by an unshown layered-surface resin layer which is formed by applying an epoxy-based resin on a layered surface formed by stacking up the multilayer magnetic pieces and the electromagnetic steel plates and curing the applied resin.

FIG. 23(A) is a plan view of the multilayer packet which is placed on a horizontal table surface where the multilayer packet is viewed from above in the stacking direction. FIG. 23(B) is a side view of the multilayer packet, which is viewed from a lateral side. In FIG. 23, each magnetic piece of the multilayer packet and the layered-surface resin layer are not shown.

In the multilayer packet 140, as shown in FIG. 23, the five multilayer magnetic pieces 30 are stacked up with displacements of a predetermined distance t1. On the opposite end surfaces in the stacking direction of the multilayer magnetic piece, the two electromagnetic steel plates 35 are placed with displacements of distance t1 in the longitudinal direction as are the multilayer magnetic pieces. Each of the stacked multilayer magnetic pieces 30 is produced by stacking up a plurality of magnetic pieces.

The multilayer magnetic pieces 30 have a trapezoidal shape as shown in FIG. 23(A) such that opposite ends of a rectangle whose length in the longitudinal direction is L are cut at a slope angle of 45° (θ1=45°) with respect to the longitudinal direction, and the lengths of the long base and the short base are L1 and L2, respectively. Although not shown, the same applies to the electromagnetic steel plates.

Next, a joint portion at which multilayer packets which are constituents of a rectangular ring are joined together is described. In the multilayer core 300, the joint portion has a joining form realized by a step-lap structure. The rectangular ring which forms the multilayer core 300 is formed by joining together the opposite ends in the longitudinal direction of respective multilayer packets of four core blocks as described above. In each of the multilayer packets, the opposite ends in the longitudinal direction have steps realized by multilayer magnetic pieces formed with slopes at an inclination angle of θ1.

Four multilayer packets of such a configuration are provided. For example, as shown in FIG. 24, firstly, on the viewable surface of one of two regions of the multilayer packet 140A which are to be joint portions (square regions of w2×w2), the unviewable surface (rear surface) of the other of two regions of the multilayer packet 140B which are to be joint portions (square regions of w2×w2) is placed. Thereafter, on the viewable surface of one of the regions of the multilayer packet 140B, the unviewable surface (rear surface) of the other of two regions of the multilayer packet 140C which are to be joint portions (square regions of w2×w2) is placed. Thereafter, on the viewable surface of one of the regions of the multilayer packet 140C, the unviewable surface (rear surface) of the other of two regions of the multilayer packet 140D which are to be joint portions (square regions of w2×w2) is placed. Thereafter, on the viewable surface of one of the regions of the multilayer packet 140D, the unviewable surface of the other region of the multilayer packet 140D is placed, whereby a rectangular ring structure is built.

In the multilayer core 300, a plurality of rectangular ring structures, each formed by joining together the four multilayer packets 140A to 140D, are stacked up, whereby a multilayer core which has a desired shape can be produced. In the multilayer core 300, structural portions which form four sides of a multilayer core produced by stacking up the rectangular ring structures are core blocks. Specifically, although not shown, multilayer portions formed by, for example, stacking up multilayer packets 140A realized by stacking up rectangular ring structures are core blocks.

For example, when the unviewable surface (rear surface) of the other of the two regions of the multilayer packet 140B is placed on the viewable surface of one of the two regions of the multilayer packet 140A, steps formed in the unviewable surface and steps formed in the viewable surface face each other so that a plurality of joining surfaces are formed. That is, as shown in FIG. 25, for example, joining positions R of the magnetic pieces between the multilayer packet 140A and the multilayer packet 140B are displaced stepwise (step-lap structure). In this multilayer core, protruding portions at the corners may be cut off such that the protrusions are removed.

In such a step-lap structure, the joining positions are sequentially displaced, and therefore, the magnetic flux is unlikely to locally concentrate at a joining position, so that the iron loss and the apparent power can be suppressed to low levels.

INDUSTRIAL APPLICABILITY

A magnetic piece and a multilayer magnetic piece of the present disclosure are suitably used as a magnetic piece for various uses. For example, they are suitably used in cores for power distribution, cores for transformers, and cores for electronic/electric circuits.

REFERENCE SIGNS LIST 1, 1 soft magnetic amorphous alloy ribbon
2, 2 resin layer
11, 21 magnetic piece
12, 23, 30 multilayer magnetic piece
13, 100, 300 multilayer core
10A, 10B, 10C, 10D core block
20, 20A, 20B, 20C, 20D, 30A, 30B, 30C, 30D, 120, 120A, 140,
140A, 140B, 140C, 140D, 210, 220, 320, 420 multilayer packet
25A, 25B, 25C, 35 electromagnetic steel plate
27 layered-surface resin layer

The invention claimed is:

1. A magnetic piece comprising:
a soft magnetic amorphous alloy ribbon; and
a resin layer provided on at least one surface of the soft magnetic amorphous alloy ribbon,
wherein a resin whose Shore D hardness is not less than 1 and not more than 60 is used for the resin layer,
wherein the resin contains a polyester resin as a major constituent, and
wherein the resin further contains a polystyrene resin in the proportion of not less than 1 mass % relative to the polyester resin.

2. The magnetic piece of claim 1, wherein a resin whose Shore D hardness is not more than 25 is used for the resin layer.

3. The magnetic piece of claim 1, wherein the magnetic piece has a magnetic flux density (B80) of not less than 1.48 T.

4. The magnetic piece of claim 1, wherein the resin layer has a thickness of not less than 0.5 μm and not more than 1.45 μm.

5. The magnetic piece of claim 1, wherein the soft magnetic amorphous alloy ribbon has a thickness of not less than 10 μm and not more than 50 μm.

6. The magnetic piece of claim 1, wherein the soft magnetic amorphous alloy ribbon is made of an alloy which has such a composition that Si is not less than 0 atomic % and not more than 10 atomic % and B is not less than 10 atomic % and not more than 20 atomic % where the total of Fe, Si and B is 100 atomic %.

7. A multilayer magnetic piece comprising a multilayer structure consisting of a plurality of the magnetic pieces as set forth in claim 1.

8. A multilayer core comprising a roll or multilayer structure of the magnetic piece as set forth in claim 1.

9. A multilayer core comprising a multilayer structure consisting of a multilayer magnetic piece and at least one electromagnetic steel plate, the multilayer magnetic piece including a multilayer structure consisting of a plurality of the magnetic pieces as set forth in claim 1.

10. The multilayer core of claim 9, further comprising a resin layer between the multilayer magnetic piece and the at least one electromagnetic steel plate, the resin layer containing a resin whose Shore D hardness is not more than 60.

11. A multilayer packet comprising:
a multilayer magnetic piece which includes a multilayer structure consisting of a plurality of the magnetic pieces as set forth in claim 1; and
at least one electromagnetic steel plate provided on at least part of an end surface in a stacking direction of the multilayer magnetic piece.

12. The multilayer packet of claim 11, further comprising a resin layer between the electromagnetic steel plate and the multilayer magnetic piece, the resin layer containing a resin whose Shore D hardness is not more than 60.

* * * * *